US012024395B2

(12) United States Patent
Sakai

(10) Patent No.: US 12,024,395 B2
(45) Date of Patent: Jul. 2, 2024

(54) MEDIUM TRANSPORT DEVICE, CONTROL METHOD, AND CONTROL PROGRAM

(71) Applicant: PFU LIMITED, Kahoku (JP)

(72) Inventor: Masaaki Sakai, Kahoku (JP)

(73) Assignee: PFU LIMITED, Kahoku (JP)

(*) Notice: Subject to any disclaimer, the term of this patent is extended or adjusted under 35 U.S.C. 154(b) by 476 days.

(21) Appl. No.: 17/299,284

(22) PCT Filed: Mar. 20, 2019

(86) PCT No.: PCT/JP2019/011887
§ 371 (c)(1),
(2) Date: Jun. 2, 2021

(87) PCT Pub. No.: WO2020/188817
PCT Pub. Date: Sep. 24, 2020

(65) Prior Publication Data
US 2022/0033210 A1 Feb. 3, 2022

(51) Int. Cl.
*B65H 7/14* (2006.01)
*H04N 1/00* (2006.01)

(52) U.S. Cl.
CPC ........... *B65H 7/14* (2013.01); *H04N 1/00702* (2013.01); *H04N 1/00734* (2013.01); *B65H 2553/41* (2013.01); *B65H 2553/42* (2013.01)

(58) Field of Classification Search
CPC ........ B65H 7/06; B65H 7/14; B65H 2553/41; B65H 2553/42; B65H 2701/18292
See application file for complete search history.

(56) References Cited

U.S. PATENT DOCUMENTS 8,201,823 B2* 6/2012 Morikawa ............ B65H 3/5261
271/10.01
10,322,898 B2* 6/2019 Kogi .................... B65H 3/063
(Continued)

FOREIGN PATENT DOCUMENTS

JP 2004-182449 A 7/2004
JP 2006-298606 A 11/2006
(Continued)

OTHER PUBLICATIONS

International Search Report dated May 21, 2019 for corresponding PCT Application No. PCT/JP2019/011887 (3 pages) with English Translation (2 pages).
(Continued)

*Primary Examiner* — Howard J Sanders
(74) *Attorney, Agent, or Firm* — LEWIS ROCA ROTHGERBER CHRISTIE LLP

(57) ABSTRACT

Provided are an image processing apparatus, a control method, and a control program to accurately determine whether or not a deflection of a fed medium has occurred, and to suitably control a feeding of the medium. A medium conveying apparatus includes a feed module to feed a medium, a motion detection module to detect a first change amount in a feeding direction of the medium placed on a medium tray and a second change amount in a direction perpendicular to a placing surface of the medium tray during feeding of the medium, a determination module to determine that a deflection of the medium has occurred when the first change amount is less than a first threshold value and the second change amount is equal to or more than a second threshold value, and a control module to stop feeding the medium according to the determination result.

20 Claims, 28 Drawing Sheets

(56) References Cited

U.S. PATENT DOCUMENTS

| | | | |
|---|---|---|---|
| 11,292,683 B2* | 4/2022 | Shiota | H04N 1/00777 |
| 2007/0114716 A1 | 5/2007 | Morikawa et al. | |
| 2012/0319348 A1 | 12/2012 | Oshiro et al. | |
| 2017/0355539 A1* | 12/2017 | Yoshiwara | H04N 1/00777 |
| 2017/0359475 A1* | 12/2017 | Xie | H04N 1/00628 |
| 2018/0215564 A1 | 8/2018 | Matsumura | |
| 2018/0376020 A1* | 12/2018 | Shiota | G03G 15/70 |

FOREIGN PATENT DOCUMENTS

| | | | |
|---|---|---|---|
| JP | 2007-137655 A | | 6/2007 |
| JP | 2010-089943 A | | 4/2010 |
| JP | 2010089943 A | * | 4/2010 |
| JP | 2012-96852 A | | 5/2012 |
| JP | 2013-1573 A | | 1/2013 |
| JP | 2017-208588 A | | 11/2017 |
| JP | 2017-222511 A | | 12/2017 |
| JP | 2018-122950 A | | 8/2018 |

OTHER PUBLICATIONS

Written Opinion dated May 21, 2019 for corresponding PCT Application No. PCT/JP2019/011887 (4 pages) with English Translation (5 pages).

International Preliminary Report on Patentability dated Sep. 16, 2021 for corresponding PCT Application No. PCT/JP2019/011887 (5 pages) with English Translation (6 pages).

Japanese Office Action dated Mar. 18, 2022 regarding Japanese Patent Application No. 2021-506113 corresponding to U.S. Appl. No. 17/299,284 (2 pages) with English Translation (5 pages).

Japanese Office Action dated May 16, 2023 regarding Japanese Patent Application No. 2022-133746 corresponding to U.S. Appl. No. 17/299,284 (2 pages) with English Translation (4 pages).

* cited by examiner

FIG. 9

| ITEM | MEDIUM TYPE | DETECTION RESULT OF CHANGE AMOUNT | | | DETECTION RESULT OF DEFLECTION |
|---|---|---|---|---|---|
| | | FIRST CHANGE AMOUNT | SECOND CHANGE AMOUNT | THIRD CHANGE AMOUNT | |
| 1 | MEDIA BOUND ALONG FEEDING DIRECTION | SMALL | MIDDLE | NONE | DEFLECTION |
| 2 | MEDIA WITH UPSTREAM END BOUND ALONG WIDTH DIRECTION | NONE | MIDDLE | NONE | DEFLECTION |
| 3 | MEDIA WITH DOWNSTREAM END BOUND ALONG WIDTH DIRECTION | LARGE | NONE | NONE | NO DEFLECTION |
| 4 | MEDIA WITH BOUND UPSTREAM END CORNER | NONE | MIDDLE | SMALL | DEFLECTION |
| 5 | MEDIA WITH BOUND DOWNSTREAM END CORNER | SMALL | NONE | SMALL | DEFLECTION |
| 6 | MEDIUM MOUNTAIN FOLDED ALONG WIDTH DIRECTION | LARGE | MIDDLE | NONE | NO DEFLECTION |
| 7 | MEDIUM VALLEY FOLDED ALONG WIDTH DIRECTION | LARGE | MIDDLE | NONE | NO DEFLECTION |
| 8 | MEDIUM MOUNTAIN FOLDED ALONG FEEDING DIRECTION | LARGE | NONE | NONE | NO DEFLECTION |
| 9 | MEDIUM VALLEY FOLDED ALONG FEEDING DIRECTION | LARGE | NONE | NONE | NO DEFLECTION |

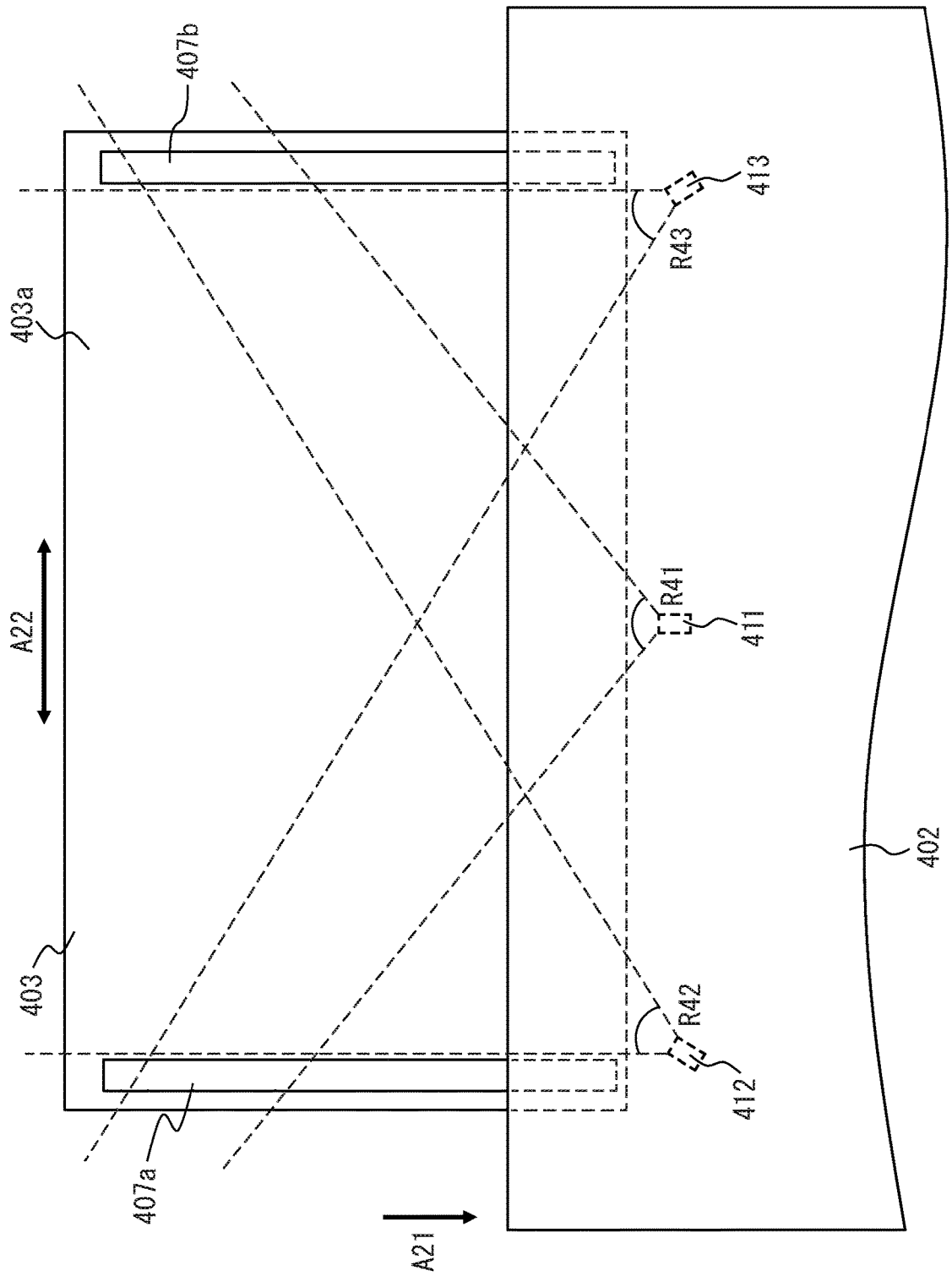

FIG. 20

| ITEM | MEDIUM TYPE | DETECTION RESULT OF CHANGE AMOUNT | | | DETECTION RESULT OF DEFLECTION |
|---|---|---|---|---|---|
| | | FIRST CHANGE AMOUNT | SECOND CHANGE AMOUNT | THIRD CHANGE AMOUNT | |
| 1 | MEDIA BOUND ALONG FEEDING DIRECTION | MIDDLE | MIDDLE | NONE | DEFLECTION |
| 2 | MEDIA WITH UPSTREAM END BOUND ALONG WIDTH DIRECTION | MIDDLE | LARGE | NONE | DEFLECTION |
| 3 | MEDIA WITH DOWNSTREAM END BOUND ALONG WIDTH DIRECTION | LARGE | NONE | NONE | NO DEFLECTION |
| 4 | MEDIA WITH BOUND UPSTREAM END CORNER | MIDDLE | LARGE | SMALL | DEFLECTION |
| 5 | MEDIA WITH BOUND DOWNSTREAM END CORNER | MIDDLE | NONE | MIDDLE | DEFLECTION |
| 6 | MEDIUM MOUNTAIN FOLDED ALONG WIDTH DIRECTION | LARGE | MIDDLE | NONE | NO DEFLECTION |
| 7 | MEDIUM VALLEY FOLDED ALONG WIDTH DIRECTION | LARGE | MIDDLE | NONE | NO DEFLECTION |
| 8 | MEDIUM MOUNTAIN FOLDED ALONG FEEDING DIRECTION | LARGE | NONE | NONE | NO DEFLECTION |
| 9 | MEDIUM VALLEY FOLDED ALONG FEEDING DIRECTION | LARGE | NONE | NONE | NO DEFLECTION |

MEDIUM TRANSPORT DEVICE, CONTROL METHOD, AND CONTROL PROGRAM

CROSS-REFERENCE TO RELATED APPLICATIONS

This application is a U.S. National Phase Patent Application of International Application Number PCT/JP2019/011887, filed on Mar. 20, 2019, the entire contents which are incorporated herein by reference.

FIELD

The present disclosure relates to a medium conveying apparatus, a control method and a control program, and more particularly to a medium conveying apparatus, a control method and a control program to determine a deflection of a medium.

BACKGROUND

A medium conveying apparatus, such as a scanner, for conveying a medium, such as a document, and reading an image of the conveyed medium has a function of separating and feeding a plurality of media. However, when a two-folded medium, stapled media, or a filed medium such as a transport slip or a passport, etc., is conveyed, with the function of separating and feeding a plurality of media enabled, the medium is not separated, and there is a possibility that a jam of the medium occurs.

A paper state detecting apparatus to detect a paper storage state or a conveyance state of a paper by an imaging camera or a line sensor, and determine whether or not a specific paper state in which a paper conveyance abnormality may occur based on the detection result, is disclosed (PTL 1). The paper state detecting apparatus notifies or stops an operation of a conveying device when it determines that the paper is in the specific paper state.

A paper conveying apparatus to detect a moving speed, a moving amount or a moving direction of a paper based on an image output from a plurality of imaging means arranged in a paper conveyance direction or a direction perpendicular to a paper conveyance direction, and control paper conveyance based on the detection result, is disclosed (PTL 2).

A document conveying apparatus to detect heights of a plurality of measurement points on a surface of a document by a plurality of distance sensors provided at positions facing the surface of the document placed on a document placing unit, and determine a state of the document based on the detected height before conveyance, is disclosed (PTL 3).

CITATION LIST

Patent Literature

[PTL 1] Japanese Unexamined Patent Application Publication (Kokai) No. 2006-298606
[PTL 2] Japanese Unexamined Patent Application Publication (Kokai) No. 2012-96852
[PTL 3] Japanese Unexamined Patent Application Publication (Kokai) No. 2017-208588

SUMMARY

The medium conveying apparatus is desired to accurately determine whether or not a deflection of a fed medium has occurred, and to suitably control a feeding of the medium.

An object of the medium conveying apparatus, a control method, and a control program is to accurately determine whether or not a deflection of a fed medium has occurred, and to suitably control a feeding of the medium.

According to some embodiments, a medium conveying apparatus includes a medium tray, a feed module to feed a medium placed on the medium tray, a motion detection module to detect a first change amount in a feeding direction of the medium placed on the medium tray and a second change amount in a direction perpendicular to a placing surface of the medium tray during feeding of the medium, a determination module to determine that a deflection of the medium has occurred when the first change amount is less than a first threshold value and the second change amount is equal to or more than a second threshold value, and a control module to stop feeding the medium according to the determination result by the determination module.

According to some embodiments, a control method of a medium conveying apparatus including a medium tray, a feed module to feed a medium placed on the medium tray, and a motion detection module to detect a first change amount in a feeding direction of the medium placed on the medium tray and a second change amount in a direction perpendicular to a placing surface of the medium tray during feeding of the medium, includes determining that a deflection of the medium has occurred when the first change amount is less than a first threshold value and the second change amount is equal to or more than a second threshold value, and stopping feeding the medium according to the determination result in the determination.

According to some embodiments, a control program of a medium conveying apparatus including a medium tray, a feed module to feed a medium placed on the medium tray, and a motion detection module to detect a first change amount in a feeding direction of the medium placed on the medium tray and a second change amount in a direction perpendicular to a placing surface of the medium tray during feeding of the medium, causes the medium conveying apparatus to execute determining that a deflection of the medium has occurred when the first change amount is less than a first threshold value and the second change amount is equal to or more than a second threshold value, and stopping feeding the medium according to the determination result in the determination.

According to the present embodiment, the medium conveying apparatus, the control method, and the control program can accurately determine whether or not a deflection of a fed medium has occurred, and suitably control a feeding of the medium.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

BRIEF DESCRIPTION OF DRAWINGS

FIG. 9 is a table illustrating a relationship between a detection result of each change amount and a detection result of a deflection of a medium.

FIG. 19 is a schematic diagram for illustrating the center sensor 411, etc.

FIG. 20 is a table illustrating a relationship between a detection result of each change amount and a detection result of a deflection of a medium.

DESCRIPTION OF EMBODIMENTS

Hereinafter, a medium conveying apparatus, a control method and a control program according to an embodiment, will be described with reference to the drawings. However, it should be noted that the technical scope of the invention is not limited to these embodiments, and extends to the inventions described in the claims and their equivalents.

Figure 1:
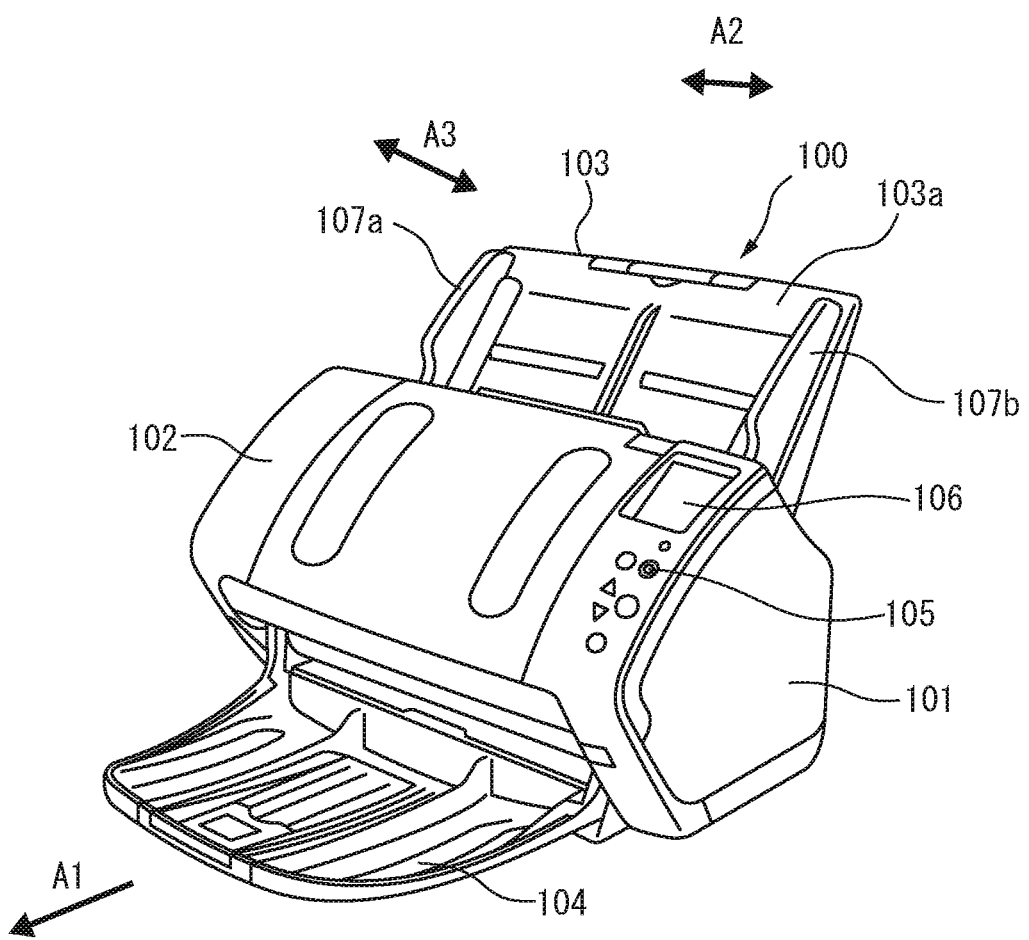
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is a paper, a thick paper, a card, a brochure, a passport, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying apparatus 100 and is engaged with the lower housing 101 by hinges so as to be opened and closed at a time of medium jam, during cleaning the inside of the medium conveying apparatus 100, etc. In other words, the upper housing 102 is located above the lower housing 101 and functions as a housing cover to cover the lower housing 101.

The medium tray 103 is engaged with the lower housing 101 in such a way as to be able to place a medium to be fed on a placing surface 103*a*. The medium tray 103 has side guides 107*a* and 107*b* movably provided on the placing surface 103*a* in a width direction A2 perpendicular to a medium feeding direction A1, to regulate a width direction of the media stacked in a height direction A3 perpendicular to the placing surface 103*a*. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
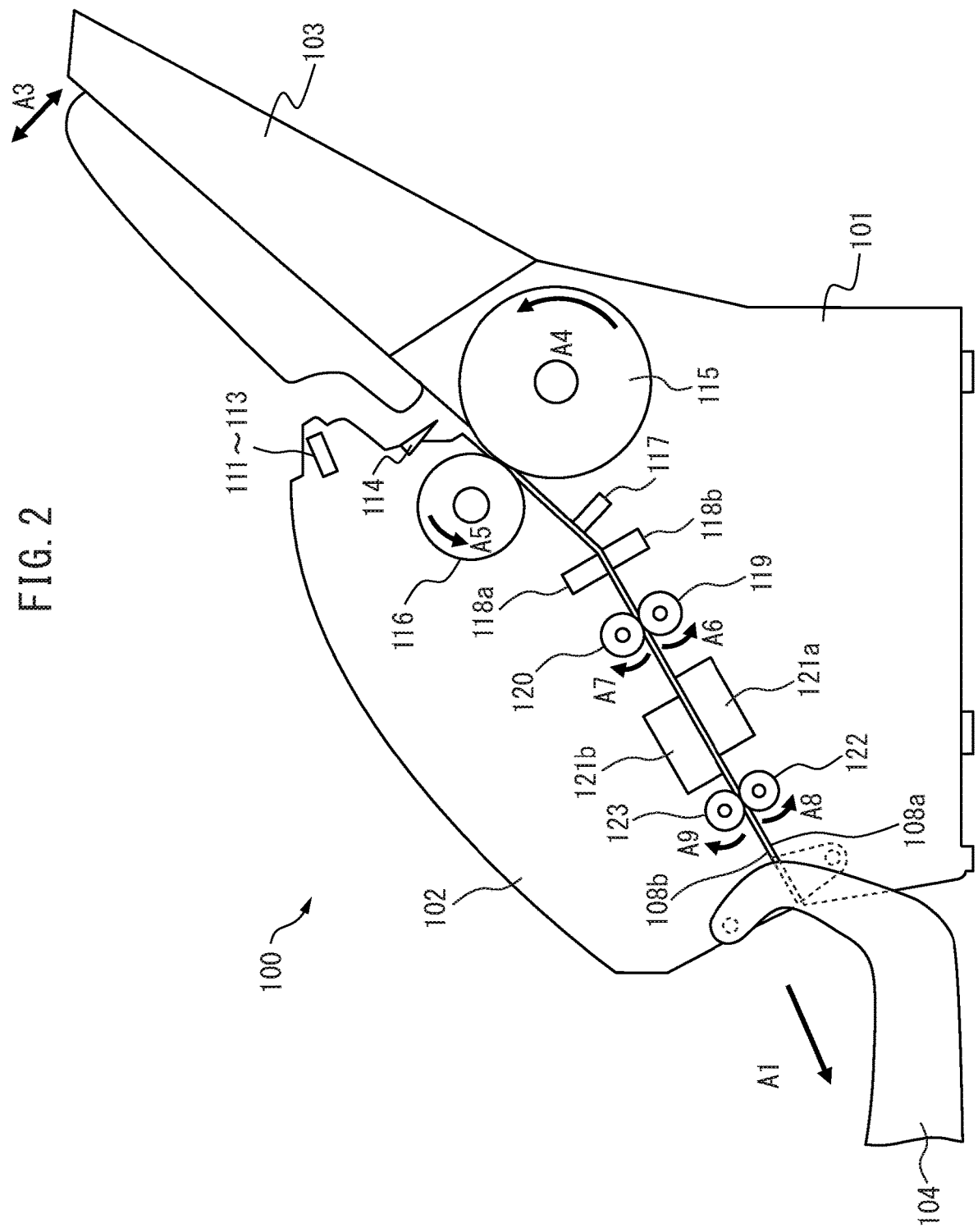
FIG. 2 is a diagram or illustrating a conveyance path inside the medium conveying apparatus 100.

FIG. 2 is a diagram for illustrating a conveyance path inside the medium conveying apparatus 100.

The conveyance path inside the medium conveying apparatus 100 includes a center sensor 111, a first side sensor 112, a second side sensor 113, a first medium detection sensor 114, a feed roller 115, a brake roller 116, a second medium detection sensor 117, an ultrasonic transmitter 118*a*, an ultrasonic receiver 118*b*, a first conveyance roller 119, a second conveyance roller 120, a first imaging device 121*a*, a second imaging device 121*b*, a first discharge roller 122 and a second discharge roller 123, etc. The numbers of each roller is not limited to one, and may be plural. Hereinafter, the first imaging device 121*a* and the second imaging device 121*b* may be collectively referred to as an imaging device 121.

A top surface of the lower housing 101 forms a lower guide 108a of a conveyance path of a medium, and a bottom surface of the upper housing 102 forms an upper guide 108b of the conveyance path of a medium. An arrow A1 in FIG. 2 indicates a medium feeding direction. Hereinafter, an upstream refers to an upstream in the feeding direction A1, and a downstream refers to a downstream in the feeding direction A1.

The center sensor 111, the first side sensor 112 and the second side sensor 113 are located on the upstream end of the upper housing 102, i.e., on the upper side with respect to a medium conveyance path, and on the upstream side of the feed roller 115 and the brake roller 116. The center sensor 111, the first side sensor 112 and the second side sensor 113 may be located on the downstream side of the feed roller 115 and the brake roller 116, if they can image the medium tray 103 and detect a state of the medium placed on the medium tray 103. The details of the center sensor 111, the first side sensor 112 and the second side sensor 113 will be described later.

The first medium detection sensor 114 is located on the downstream side of the center sensor 111, the first side sensor 112 and the second side sensor 113. The first medium detection sensor 114 includes a contact detection sensor and detects whether or not a medium is placed on the loading tray 103. The first medium detection sensor 114 generates and outputs a first medium detection signal changing the signal value between a state in which a medium is placed on the medium tray 103 and a state in which a medium is not placed on the medium tray 103.

The feed roller 115 and the brake roller 116 are located on the downstream side of the first medium detection sensor 114. The feed roller 115 is provided on the lower housing 101, and the brake roller 116 is provided on the upper housing 102 to face the feed roller 115. The feed roller 115 and the brake roller 116 are an example of a feed module to feed by separating the medium placed on the medium tray 103, and sequentially feed the medium placed on the medium tray from a lower side.

The second medium detection sensor 117 is located on the downstream side of the feed roller 115 and the brake roller 116 and the upstream side of the first conveyance roller 119 and the second conveyance roller 120, i.e., on the upstream side of the imaging device 121, to detect whether or not the medium exists at the position. The second medium detection sensor 117 includes a light emitter and a light receiver provided on one side with respect to the medium conveyance path, and a reflecting member such as a mirror provided at a position facing the light emitter and the light receiver across the conveyance path. The light emitter emits light toward the conveyance path. On the other hand, the light receiver receives light emitted by the light emitter and reflected by the reflection member and outputs a second medium signal being an electric signal based on intensity of the received light. The light emitted by the light emitter is shielded by the medium when the medium is present at the position of the second sensor 117. Therefore, the signal value of the second medium signal is changed in a state where the medium is present at the position of the second sensor 117 and a state where the medium is not present. The light emitter and the light receiver may be provided at positions facing one another with the conveyance path in between, and the reflection member may be omitted.

The ultrasonic transmitter 118a and the ultrasonic receiver 118b are located on the downstream side of the feed roller 115 and the brake roller 116 and on the upstream side of the first conveyance roller 119 and the second conveyance roller 120, i.e., on the upstream side of the imaging device 121. The ultrasonic transmitter 118a and the ultrasonic receiver 118b are located close to the conveyance path of a medium in such a way as to face one another with the conveyance path in between. The ultrasonic transmitter 118a outputs an ultrasonic wave. On the other hand, the ultrasonic receiver 118b receives an ultrasonic wave being transmitted by the ultrasonic transmitter 118a and passing through a medium, and generates and outputs an ultrasonic signal being an electric signal corresponding to the received ultrasonic wave. The ultrasonic transmitter 118a and the ultrasonic receiver 118b may be hereinafter collectively referred to as an ultrasonic sensor 118.

The first imaging device 121a includes a reduction optical system type line sensor including an imaging element based on charge coupled devices (CCDs) linearly located in a main scanning direction. Further, the first imaging device 121a includes a lens for forming an image on the imaging element, and an A/D converter for amplifying and analog-digital (A/D) converting an electric signal output from the imaging element. The first imaging device 121a generates and outputs an input image acquired by imaging a front surface of a conveyed medium.

Similarly, the second imaging device 121b includes a reduction optical system type line sensor including an imaging element based on CCDs linearly located in the main scanning direction. Further, the second imaging device 121b includes a lens for forming an image on the imaging element, and an A/D converter for amplifying and A/D converting an electric signal output from the imaging element. The second imaging device 121b generates and outputs an input image acquired by imaging a back surface of a conveyed medium.

Only either of the first imaging device 121a and the second imaging device 121b may be located in the medium conveying apparatus 100 and only one side of a medium may be read. Further, a unity-magnification optical system type contact image sensor (CIS) including an imaging element based on a complementary metal oxide semiconductor (CMOS) may be used in place of the imaging element based on CCDs.

The medium placed on the medium tray 103 is conveyed in the feeding direction A1 between the lower guide 108a and the upper guide 108b by the feed roller 115 rotating in the direction of the arrow A4 in FIG. 2. The brake roller 116 rotates in the direction of the arrow A5 when the medium is fed. By the workings of the feed roller 115 and the brake roller 116, when a plurality of media are placed on the medium tray 103, only a medium in contact with the feed roller 115, out of the media placed on the medium tray 103, is separated. Consequently, the medium conveying apparatus 100 operates in such a way that conveyance of a medium other than the separated medium is restricted (prevention of multi-feed).

The medium is fed between the first conveyance roller 119 and the second conveyance roller 120 while being guided by lower guide 108a and the upper guide 108b. The medium is fed between the first imaging device 121a and the second imaging device 121b by the first conveyance roller 119 and the second conveyance roller 120 rotating in directions of an arrow A6 and an arrow A7, respectively. The media read by the imaging device 121 is ejected onto the ejection tray 104 by the first discharge roller 122 and the second discharge roller 123 rotating in directions of an arrow A8 and an arrow A9, respectively.

Figure 3:
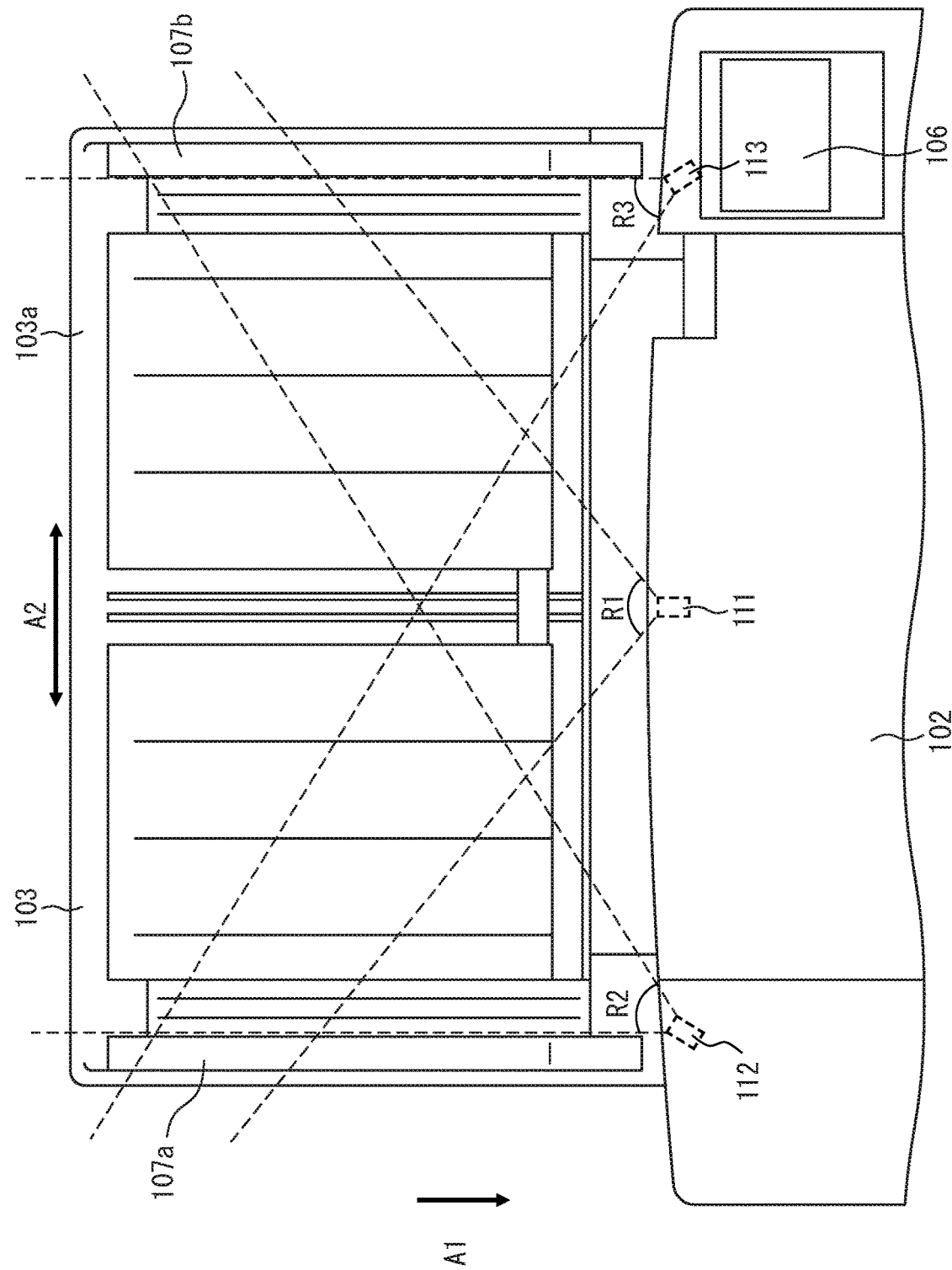
FIG. 3 is a schematic diagram for illustrating a center sensor etc.

FIG. 3 is a schematic diagram for illustrating the center sensor 111, the first side sensor 112 and the second side sensor 113. FIG. 3 is a schematic diagram of the upstream side of the medium conveying apparatus 100 viewed from above.

As shown in FIG. 3, the center sensor 111, the first side sensor 112 and the second side sensor 113 are spaced from each other and located alongside in the width direction A2. The center sensor 111 is located at a position facing a central position of the medium tray 103. The first side sensor 112 is located outside the center sensor 111 and on one side guide 107a side. The second side sensor 113 is located outside the center sensor 111 and on the other side guide 107b side.

The center sensor 111, the first side sensor 112 and the second side sensor 113 are area sensors such as an imaging sensor. Each imaging sensor includes an imaging element, a lens for forming an image on the imaging element, and an A/D converter for amplifying and A/D converting an electric signal output from the imaging element. The imaging element is a CCD or CMOS, etc., arranged in one or two dimensions.

Each sensor is located so that the imaging direction (lens optical axis) faces the upstream side in the feeding direction A1, particularly the substantially central position of the medium tray 103 in the width direction A2, and faces the lower side (the placing surface 103a side) in the height direction A3. Particularly, the center sensor 111 is located so that the entire medium placed on the medium tray 103 is included in the imaging range R1 in the width direction A2. The first side sensor 112 is located so that a region on the one side guide 107a side of the medium placed on the medium tray 103 is included in the imaging range R2. The second side sensor 113 is located so that a region on the other side guide 107b side of the medium placed on the medium tray 103 is included in the imaging range R2.

Each sensor is preferably a wide angle view sensor, and preferably provided so that the entire medium of the maximum size supported by the medium conveying apparatus 100 is included in each imaging range of each sensor when the medium is placed on the medium tray 103. Each sensor is provided so that each region in the medium of the maximum size placed on the medium tray 103, particularly at the upstream end of the medium, is included in the imaging range of at least any of the sensors.

Each sensor images the medium placed on the medium tray 103 at regular intervals, and outputs an image acquired by imaging the medium. The center sensor 111 generates a first image, the first side sensor 112 generates a second image, and the second side sensor 113 generates a third image.

Figure 4:
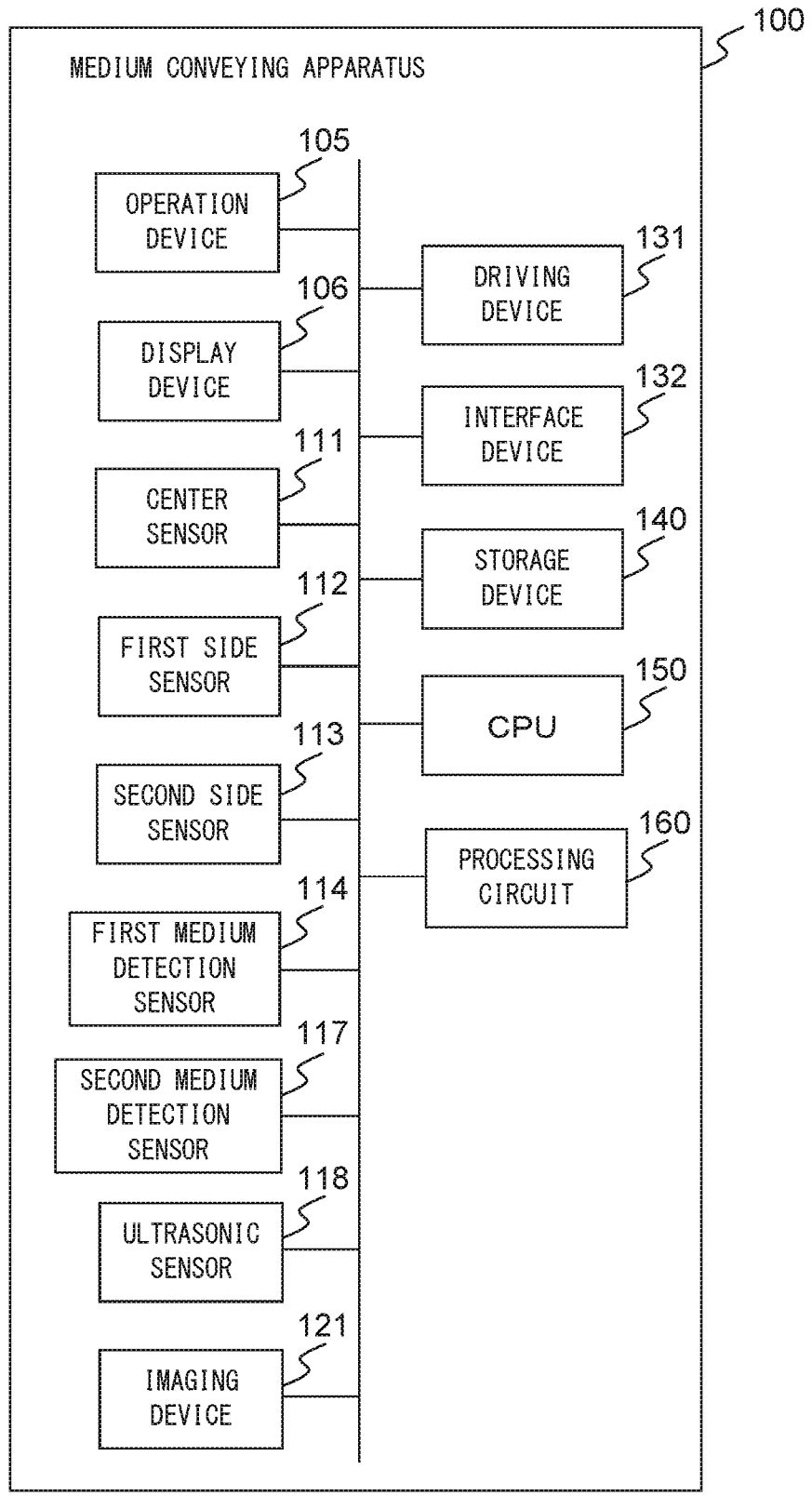
FIG. 4 is a block diagram illustrating a schematic configuration of the medium conveying apparatus 100.

FIG. 4 is a block diagram illustrating a schematic configuration of the medium conveying apparatus 100.

The medium conveying apparatus 100 further includes a driving device 131, an interface device 132, a storage device 140, a CPU (Central Processing Unit) 150 and a processing circuit 160, etc., in addition to the configuration described above.

The driving device 131 includes one or a plurality of motors, and conveys a medium by rotating the feed roller 115, the brake roller 116, the first conveyance roller 119, the second conveyance roller 120, the first discharge roller 122 and the second discharge roller 123, by a control signal from CPU 150.

For example, the interface device 132 includes an interface circuit conforming to a serial bus such as universal serial bus (USB), is electrically connected to an unillustrated information processing device (for example, a personal computer or a mobile information terminal), and transmits and receives an input image and various types of information. Further, a communication device including an antenna transmitting and receiving wireless signals, and a wireless communication interface device for transmitting and receiving signals through a wireless communication line in conformance with a predetermined communication protocol may be used in place of the interface device 132. For example, the predetermined communication protocol is a wireless local area network (LAN).

The storage device 140 includes a memory device such as a random access memory (RAM) or a read only memory (ROM), a fixed disk device such as a hard disk, or a portable storage device such as a flexible disk or an optical disk. Further, the storage device 140 stores a computer program, a database, a table, etc., used for various types of processing in the medium conveying apparatus 100. The computer program may be installed on the storage device 140 from a computer-readable, non-transitory medium such as a compact disc read only memory (CD-ROM), a digital versatile disc read only memory (DVD-ROM), etc., by using a well-known setup program, etc.

The CPU 150 operates in accordance with a program previously stored in the storage device 140. The processing circuit 150 may be a digital signal processor (DSP), a large scale integration (LSI), an application specific integrated circuit (ASIC), a field-programmable gate array (FPGA), etc.

The CPU 150 is connected to the operating device 105, the display device 106, the center sensor 111, the first side sensor 112, the second side sensor 113, the first medium detection sensor 114, the second medium detection sensor 117, the ultrasonic sensor 118, the imaging device 121, the driving device 131, the interface device 132, the storage device 140 and the processing circuit 160, etc., and controls each unit. The CPU 150, performs drive control of the driving device 131, imaging control of the imaging device 121, etc., acquires an image, and transmits the image to an information processing apparatus (not shown) through the interface device 132. Further, the CPU 150 determines whether or not a deflection of the medium placed on the medium tray 103 has occurred, based on an image generated by the center sensor 111, the first side sensor 112 or the second side sensor 113.

The processing circuit 160 executes predetermined image processing on an image imaged by the imaging device 121 and stores the image on which the image processing is executed into the storage device 140. A DSP, an LSI, an ASIC, an FPGA, etc., may be used in place of the processing circuit 160.

Figure 5:
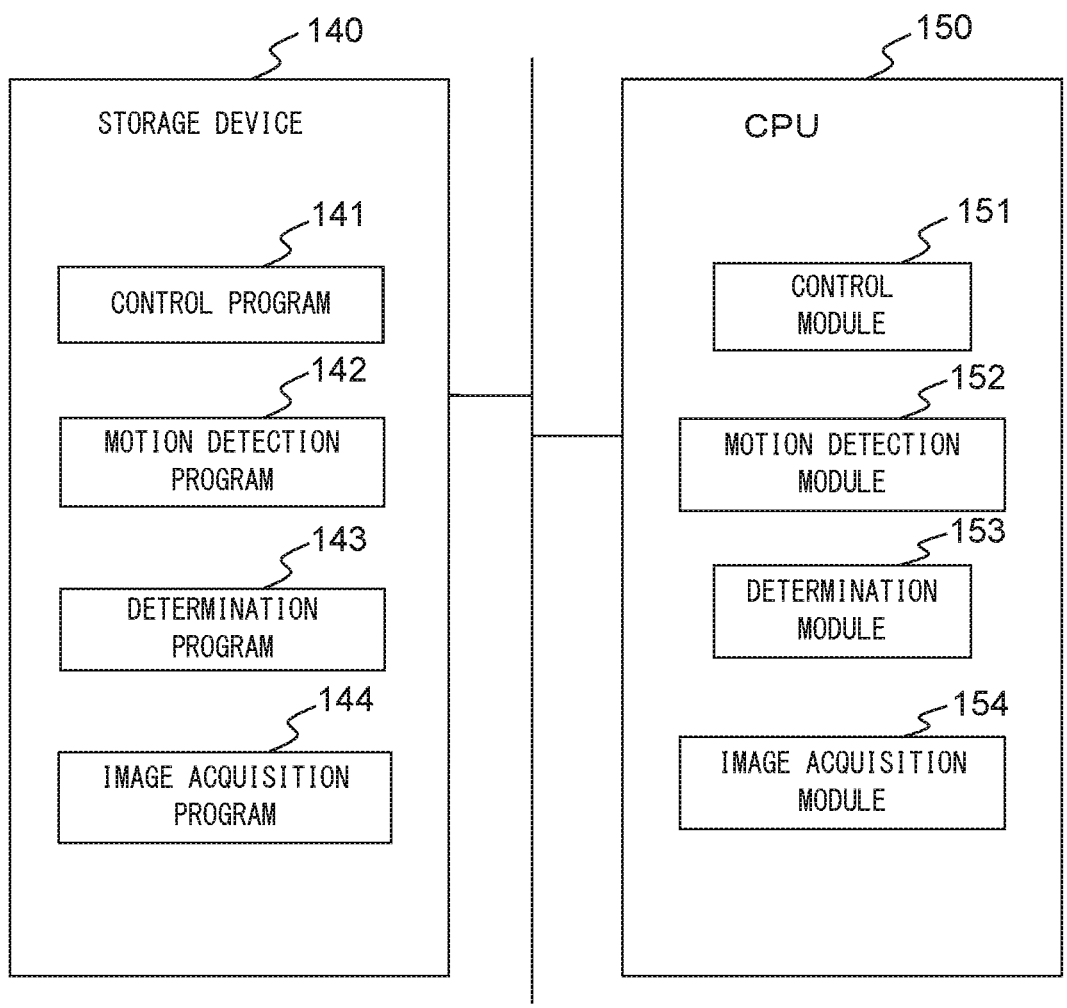
FIG. 5 is a diagram illustrating schematic configurations of a storage device 140 and a CPU 150.

FIG. 5 is a diagram illustrating schematic configurations of the storage device 140 and the processing circuit 150.

As illustrated in FIG. 5, a control program 141, a motion detection program 142, a determination program 143 and an image acquisition program 144, etc., are stored in the storage device 140. Each of these programs is a functional module implemented by software operating on a processor. The processing circuit 150 reads each program stored in the storage device 140 and operates in accordance with each read program. Thus, the CPU 150 functions as a control module 151, a motion detection module 152, a determination module 153 and an image acquisition module 154.

Figure 6:
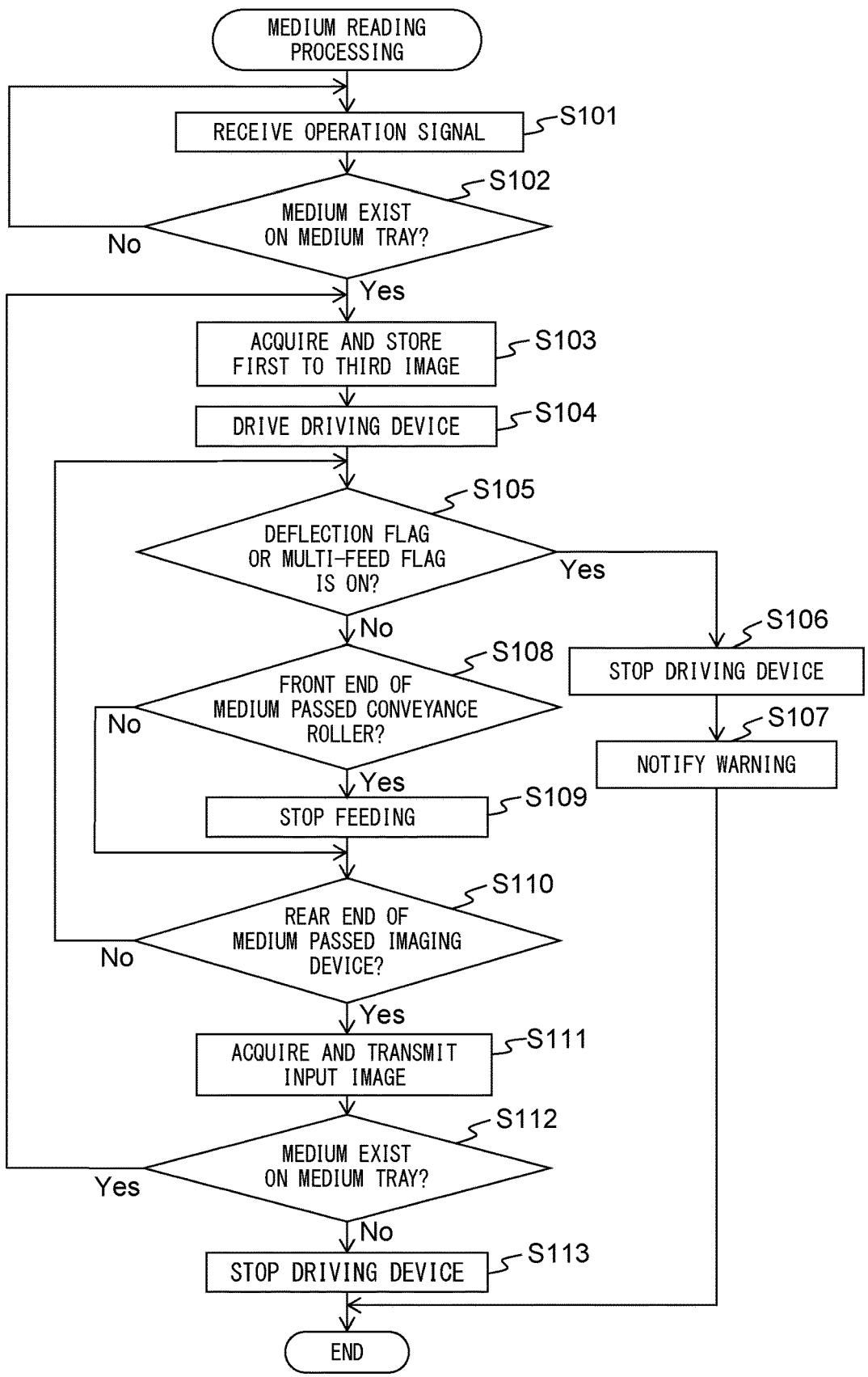
FIG. 6 is a flowchart illustrating an operation example of a medium reading processing.

FIG. 6 is a flowchart illustrating an operation example of medium reading processing in the medium conveying apparatus 100.

Referring to the flowchart illustrated in FIG. 6, an operation example of the medium reading processing in the medium conveying apparatus 100 will be described below. The operation flow described below is executed mainly by the CPU 150 in cooperation with each element in the medium conveying apparatus 100, in accordance with a program previously stored in the storage device 140. The operation flow illustrated in FIG. 6 is periodically executed.

First, the control module 151 stands by until an instruction to read a medium is input by a user by use of the operation device 105, and an operation signal instructing to read the medium is received from the operation device 105 (step S101).

Next, the control module 151 acquires the first medium detection signal from the first medium detection sensor 114 and determines whether or not a medium is placed on the medium tray 103, based on the acquired first medium detection signal (step S102).

When a medium is not placed on the medium tray 103, the control module 151 returns the processing to step S101 and stands by until newly receiving an operation signal from the operation device 105.

On the other hand, when the medium is placed on the medium tray 103, the motion detection module 152 acquires the first image, the second image and the third image from the center sensor 111, the first side sensor 112 and the second side sensor 113, and stores them in the storage device 140 (step S103). The motion detection module 152 stores the acquired first image, second image and third image in the storage device 140 as a first initial image, a second initial image and a third initial image, respectively.

Next, the control module 151 drives the driving device 131, and rotates the feed roller 115, the brake roller 116, the first conveyance roller 119, the second conveyance roller 120, the first discharge roller 122 and the second discharge roller 123 to feed and convey the medium (step S104). Further, the image acquisition module 154 causes the imaging device 121 to start imaging the conveyed medium.

Next, the control module 151 determines whether or not a deflection flag or a multi-feed flag is set to ON (step S105). The deflection flag and the multi-feed flag are respectively set to OFF at the start of reading for each medium, and are set to ON when the determination module 153 determines that the deflection of the medium or the multi-feed has occurred in determination processing to be described later.

When either the deflection flag or the multi-feed flag is set to ON, the control module 151 stops the driving device 131, and stops feeding and conveying the medium (step S106). Thus, the control module 151 stops feeding the medium, according to the determination result by the determination module 153. The medium conveying apparatus 100 stops feeding the medium in which the deflection or the multi-feed has occurred, thereby preventing the medium from occurring a jam when a two-folded medium, stapled media, or a filed medium, etc., is conveyed.

Next, the control module 151 notifies a user of a warning indicating that the deflection of the medium has occurred or the multi-feed of the medium has occurred (step S107), and ends the series of steps. The control module 151 notifies the user of the warning, by displaying the warning on the display device 106. The control module 151 may notify the user of the warning by transmitting information indicating the warning to the information processing apparatus (not shown) through the interface device 132, to display the warning on the information processing apparatus. Thus, the control module 151 notifies the user of the warning according to the determination result. Thus, the user can recognize that an abnormality has occurred in the feeding of the medium and modify the medium to an appropriate state or disable the separation function of the medium conveying apparatus 100 to re-feed the medium. Notification processing of the warning may be omitted.

On the other hand, in step S105, when both the deflection flag and the multi-feed flag are set to OFF, the control module 151 determines whether or not a front end of the medium has passed through the first conveyance roller 119 and the second conveyance roller 120 (step S108). The control module 151 periodically receives the second medium detection signal from the second medium detection sensor 117, and determines whether or not the front end of the medium has passed through the position of the second medium detection sensor 117 based on the received second medium detection signal. The control module 151 determines that the front end of the medium has passed through the position of the second medium detection sensor 117 when the signal value of the second medium detection signal changes from a value indicating that the medium is not present to a value indicating that the medium is present. The control module 151 determines that the front end of the medium has passed through the first conveyance roller 119 and the second conveyance roller 120 when a first time has elapsed since the front end of the medium passed through the position of the second medium detection sensor 117. The first time is preset to a time when the medium moves from the position of the second medium detection sensor 117 to the position of the first conveyance roller 119 and the second conveyance roller 120. The control module 151 may determine whether or not the front end of the medium has passed through the first conveyance roller 119 and the second conveyance roller 120 based on a rotation amount (conveyance amount) of the feed roller 115.

The control module 151 may determine whether or not the front end of the medium has passed through the first conveyance roller 119 and the second conveyance roller 120, based on the medium detection result by a medium detection sensor (not shown) provided on the downstream side of the first conveyance roller 119 and the second conveyance roller 120.

When the front end of the medium has passed through the first conveyance roller 119 and the second conveyance roller 120, the control module 151 controls the driving device 131 to stop feeding the medium by stopping the rotation of the feed roller 115 and the brake roller 116 (step S109). The medium fed by the feed roller 115 and the brake roller 116, thereafter, is conveyed by the first conveyance roller 119, the second conveyance roller 120, the first discharge roller 122 and the second discharge roller 123. Incidentally, the control module 151 does not execute any process in particular when the feeding of the medium has already stopped.

When the front end of the medium has not passed through the first conveyance roller 119 and the second conveyance roller 120, or when the feeding of the medium has stopped, the control module 151 determines whether or not the rear end of the medium has passed through the imaging device 121 (step S110). The control module 151 periodically receives the second medium detection signal from the second medium detection sensor 117, and determines whether or not the rear end of the medium has passed through the position of the second medium detection sensor 117 based on the received second medium detection signal. The control module 151 determines that the rear end of the medium has passed through the position of the second medium detection sensor 117 when the signal value of the second medium detection signal changes from a value indicating that the medium is present to a value indicating that the medium is not present. The control module 151 determines that the rear end of the medium has passed through the imaging device 121 when a second time has elapsed since the rear end of the medium passes through the position of the second medium detection sensor 117. The second time is preset to the time when the medium moves from the position of the second medium detection sensor 117 to the imaging device 121. The control module 151 may determines whether or not the rear end of the medium has passed through the imaging device 121, based on the rotation amount (conveyance amount) of the feed roller 115. When the rear end of the medium has not passed through the imaging device 121, the control module 151 returns the process to step S105, repeats the process of steps S105 to S110.

On the other hand, when the rear end of the medium passes through the imaging device 121, the image acquisition module 154 acquires an input image from the imaging device 121, and transmits the acquired input image to the information processing apparatus (not shown) through the interface device 132 (step S111). When not being connected to the information processing device, the image acquisition module 154 stores the input image in the storage device 140.

Next, the control module 151 determines whether the medium remains on the medium tray 103 based on the first medium detection signal acquired from the first medium detection sensor 114 (step S112). When a medium remains on the medium tray 103, the control module 151 returns the process to step S103 and repeats the processes in steps S103 to S112.

On the other hand, when a medium does not remain on the medium tray 103, the control module 151 stops the driving device 131 (step S113) and ends the series of steps.

Figure 7:
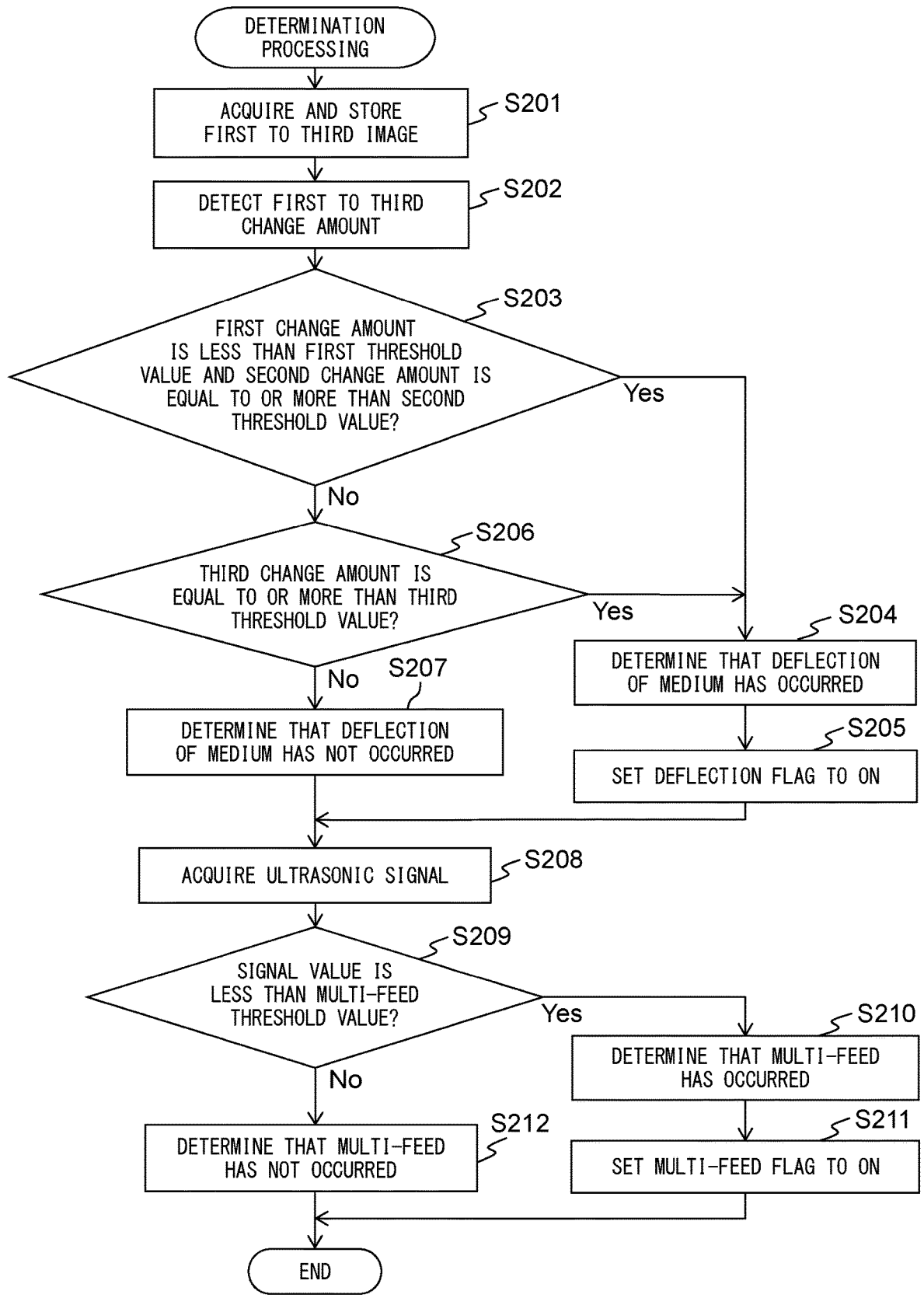
FIG. 7 is a flowchart illustrating an operation example of a determination processing.

FIG. 7 is a flowchart illustrating an operation example of the determination processing.

Hereinafter, an example of the operation of the determination process of the medium conveying apparatus 100 will be described with referring to the flowchart illustrated in FIG. 7. The operation flow described below is executed mainly by the CPU 150 in cooperation with each element in the medium conveying apparatus 100, in accordance with a program previously stored in the storage device 140. The flow of operation illustrated in FIG. 7 is periodically executed during feeding and/or conveyance of the medium.

First, the motion detection module 152 acquires the first image, the second image and the third image from the center sensor 111, the first side sensor 112 and the second side sensor 113, and stores them in the storage device 140 (step S201).

Next, the motion detection module 152 detects a first change amount in the feeding direction A1 of the medium placed on the medium tray 103 based on the first image, the second image and the third image. Further, the motion detection module 152 detects a second change amount in the height direction A3 perpendicular to the placing surface 103a of the medium tray 103, of the medium placed on the medium tray 103, based on the first image, the second image and the third image. Further, the motion detection module 152 detects a third change amount in the width direction A2 parallel to the placing surface 103a of the medium tray 103 and perpendicular to the feeding direction, of the medium placed on the medium tray 103, based on the first image, the second image and the third image (step S202).

The motion detection module 152, for example, calculate an amount of movement of an object in the image by using a known pattern matching technique. The motion detection module 152 divides the first initial image acquired in the step S103 of FIG. 6, and the first image into a plurality of blocks of a predetermined size, respectively. The motion detection module 152 extracts a block that is within a predetermined range from a position corresponding to a reference block in the first image (a position having the same coordinate as a coordinate of the reference block in the first initial image) with respect to the reference block in the first initial image as an evaluation block. The motion detection module 152 calculates a total value of absolute values of differences in brightness values of pixels corresponding to each other in the reference block and the extracted evaluation block, and specifies the evaluation block having the smallest total value as a target block corresponding to the reference block. The motion detection module 152 may specify the target block using a total value of squares of the difference in the brightness values of the pixels corresponding to each other or a normalized cross-correlation value.

The motion detection module 152 calculates a vector from each position corresponding to a plurality of reference blocks to a target block corresponding to each reference block in the first image. The motion detection module 152 detects a component in the feeding direction A1 of an average of the calculated vectors as the first movement amount, and detects a component in the width direction A2 as the third movement amount. The component in the feeding direction A1 is, for example, a component in the vertical direction in the image, and the component in the width direction A2 is, for example, a component in the horizontal direction in the image. The direction of each component may be corrected in consideration of an inclination of the imaging direction of the center sensor 111 with respect to the vertical and horizontal directions. Also, the motion detection module 152 detects the first movement amount and the third movement amount for a combination of the second initial image and the second image, and for a combination of the third initial image and the third image. The motion detection module 152 detects a maximum value, an average value or a median value of each detected first movement amount as the first change amount, and detects a maximum value, an average value or a median value of each detected third movement amount as the third change amount.

The motion detection module 152 extracts two blocks corresponding to each other for a combination of two images in the first image, the second image and the third image (for example, the second image and the third image), in the same manner as in the case of specifying the target block corresponding to the reference block. The motion detection module 152 calculates a positional deviation amount (difference in positions of the coordinates) X in the images of the two blocks for each set of the extracted two blocks. The motion detection module 152 calculates a distance D from the sensor that imaged the image corresponding to the set to a position corresponding to the block on the medium, by a following equation (1), from the positional deviation amount X, using a principle of triangulation.

$$D = P \times (f/X) \quad (1)$$

Where P is the distance P between the two sensors that imaged each image, and f is a focal length of the sensor.

Similarly, the motion detection module 152 extracts, from the initial images corresponding to the two images from which a set of blocks is extracted, a set of blocks corresponding to each block, and calculates the distance D from the sensor to the position corresponding to the block on the medium. The motion detection module 152 calculates a difference value between the distance D calculated from the initial image and the distance D calculated from the latest image for each set of blocks, and detects the maximum value, the average value or the median value of the calculated difference value as the second movement amount in the height direction A3. The motion detection module 152 calculates the second movement amount for all the combination of the two images in the first image, the second image and the third image, and detects the maximum value, the average value or the median value of the calculated second movement amount as the second change amount.

The motion detection module 152 may calculate the movement amount of the object in the image by using a feature amount of the image, instead of using the pattern matching technique. In that case, the motion detection module 152 extracts feature points indicating a predetermined characteristic portion from each image. The motion detection module 152 extracts a point of each corner or a point on each side of the medium placed on the medium tray 103, or a point on a character, a ruled line or a figure in the medium, etc., as each feature point. For this purpose, the motion detection module 152 performs edge extraction processing for each image to extract edge pixels whose luminance difference with peripheral pixels is equal to or more than a predetermined value. The motion detection module 152 acquires the feature quantity based on a position and a pattern, etc., of the extracted edge pixel. The motion detection module 152 specifies positions of each part according to whether or not the acquired feature quantity satisfies a predetermined condition for the medium mounted on the medium tray 103 or each part such as a character, a ruled line or a figure in the medium, and extracts feature points based on positions of the specified parts. The motion detection module 152 calculates each movement amount of mutually corresponding feature points extracted from each image, in the same manner as in the case of utilizing the pattern matching technique.

Thus, the motion detection module 152 detects the first change amount, the second change amount and the third change amount based on the images generated by the center sensor 111, the first side sensor 112 and the second side sensor 113.

Next, the determination module 153 determines whether or not the first change amount is less than a first threshold value, and whether or not the second change amount is equal to or more than the second threshold value (step S203). The first threshold value is preset to, for example, a value between the first change amount detected when the deflection of the medium has occurred and the first change amount detected when the deflection of the medium has not occurred, in an experiment in which various types of media are fed. Similarly, the second threshold value is preset to, for example, a value between the second change amount detected when the deflection of the medium has occurred and the second change amount detected when the deflection of the medium has not occurred, in an experiment in which various types of media are fed.

When the first change amount is less than the first threshold and the second change amount is equal to or more than the second threshold value, the determination module 153 determines that the deflection of the medium has occurred (step S204). The determination module 153 detects the deflection of the medium as a sign of the medium damage, and estimates that damage to the medium is likely to occur when the feeding of the medium is continued. Next, the determination module 153 sets the deflection flag to ON (step S205), and proceeds the process to step S208.

On the other hand, when the first change amount is equal to or more than the first threshold value, or when the second change amount is less than the second threshold value, the determination module 153 determines whether or not the third change amount is equal to or more than the third threshold value (step S206). The third threshold value is preset to, for example, a value between the third change amount calculated when the deflection of the medium has occurred and the third change amount calculated when the medium deflection has not occurred, in an experiment in which various types of media are fed.

When the third change amount is equal to or more than the third threshold value, the determination module 153 determines that the deflection of the medium has occurred (step S204). The determination module 153 detects the deflection of the medium as the sign of the medium damage, and estimates that damage to the medium is likely to occur when the feeding of the medium is continued. Next, the determination module 153 sets the deflection flag to ON (step S205), and proceeds the process to step S208.

On the other hand, when the third change amount is less than the third threshold value, the determination module 153 determines that the deflection of the medium has not occurred (step S207).

Next, the determination module 153 acquires the ultrasonic signal from the ultrasonic sensor 118 (step S208).

Next, the determination module 153 determines whether or not a signal value of the acquired ultrasonic signal is less than the multi-feed threshold value (step S209).

Figure 8:
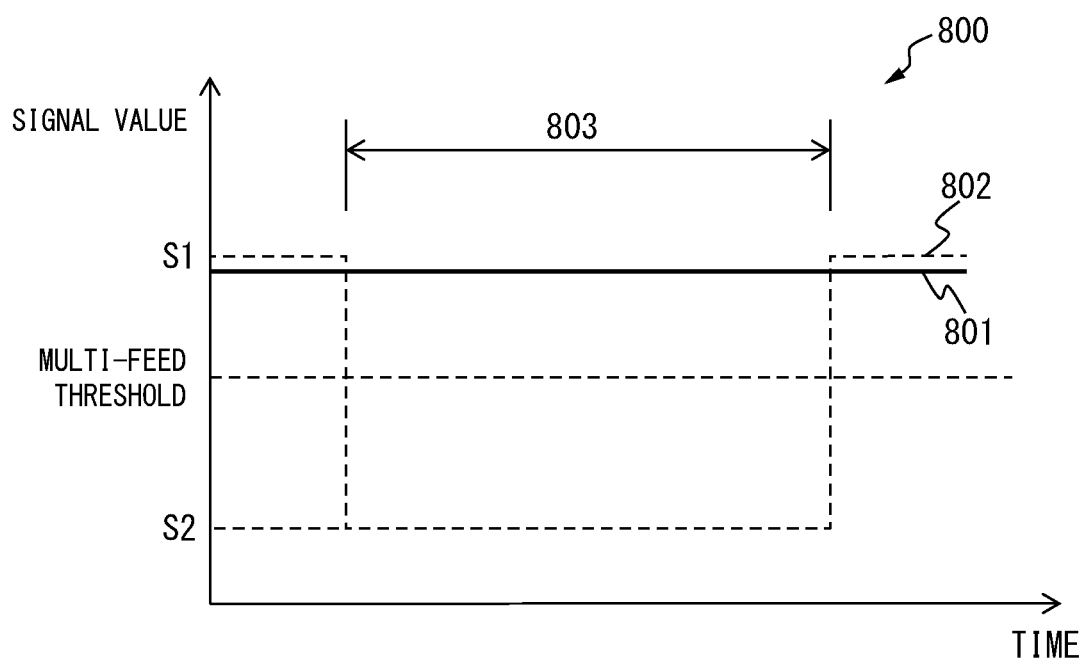
FIG. 8 is a schematic diagram for illustrating a characteristic of an ultrasonic signal.

FIG. 8 is a schematic diagram for illustrating a characteristic of an ultrasonic signal.

The horizontal axis of graph 800 in FIG. 8 indicates time, and the vertical axis indicates the signal value of the ultrasonic signal. In the graph 800, a solid line 801 represents a characteristic of an ultrasonic signal when one sheet of paper is conveyed as a medium, and a dotted line 802 represents a characteristic of an ultrasonic signal when multi-feed of paper is occurring. Due to occurrence of multi-feed, the signal value of the ultrasonic signal in the dotted line 802 declines in a section 803. The multi-feed threshold value is set to a value between a signal value S1 of the ultrasonic signal when one sheet of paper is conveyed and a signal value S2 of the ultrasonic signal when multi-feed of paper is occurring. By determining whether or not the signal value of the ultrasonic signal is less than the multi-feed threshold value, the determination module 153 can determine whether or not the multi-feed of the medium has occurred.

When the signal value of the ultrasonic signal is less than the multi-feed threshold, the determination module 153 determines that the multi-feed has occurred (step S210), sets the multi-feed flag to ON (step S211), and terminates the series of steps. On the other hand, when the signal value of the ultrasonic signal is equal to or more than the multi-feed threshold value, the determination module 153 determines that the multi-feed has not occurred (step S212), and ends the series of steps.

As a sensor to detect the change amount, only any two sensors of the center sensor 111, the first side sensor 112 and the second side sensor 113 (for example, the first side sensor 112 and the second side sensor 113) may be used. In that case, when the medium of the maximum size supported by the medium conveying apparatus 100 is placed, a wider angle view sensor (for example, a sensor in which the horizontal angle of view is 60° or more and 90° or less) is preferably used so that the entire medium is included in the imaging range of the two sensors. In this case, in step S202, the motion detection module 152 detects the maximum value or average value of the respective movement amounts calculated from the images captured by the respective sensors as the respective change amounts. This allows the medium conveying apparatus 100 to simplify hardware configuration and reduce a device size and an equipment cost.

Further, as a sensor to detect the change amount, only any one of the sensors of the center sensor 111, the first side sensor 112 and the second side sensor 113 (for example, the center sensor 111) may be used. In that case, when the medium of the maximum size supported by the medium conveying apparatus is placed, a wider angle view sensor (for example, a sensor in which the horizontal angle of view is more than 90° is preferably used, so that the entire medium is included in the imaging range of the one sensor. Further, as the distance between the sensor and the object is measured by one sensor, the imaging sensor capable of measuring the distance to the object by a known phase difference detection method, etc., is preferably used. In this case, in the step S202, the motion detection module 152 detects the respective movement amounts calculated from the images captured by the one sensor as the respective change amounts. This allows the medium conveying apparatus 100 to more simplify the hardware configuration and further reduce the device size and equipment cost.

Further, as a sensor for detecting the amount of change, the center sensor 111, in addition to the first side sensor 112 and the second side sensor 113 further one or more sensors may be used. In that case, in step S202, the motion detection module 152 detects the maximum value, the average value or the median value of the respective movement amounts calculated from the images captured by the respective sensors as the respective change amounts. Thus, the medium conveying apparatus 100 can further improve the detection accuracy of the deflection of the medium.

Further, the motion detection module 152 may detect the change amount in a fixed period rather than the change amount from before the start of feeding to the present, as the first to third change amounts. In that case, the motion detection module 152 detects the first to third change amounts by comparing each image acquired in step S201 with each image acquired in the previous time or a predetermined time before, rather than each image acquired in step S103.

Further, the determination process of the third change amount of step S206 is omitted, the determination module 153 may determine that the deflection of the medium has not occurred, when the first change amount is equal to or more than the first threshold value, or when the second change amount is less than the second threshold value. Further, the multi-feed determination processes of steps S208 to S212 may be omitted.

Figure 12A:
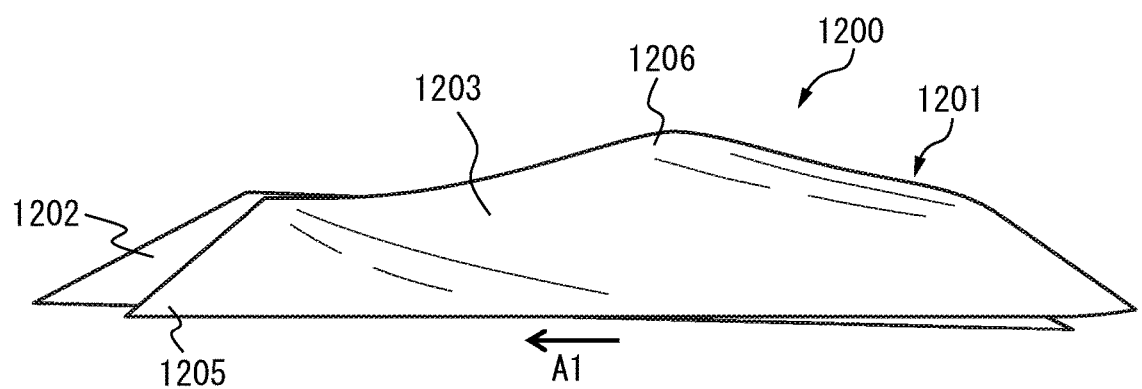
FIG. 12A is a schematic diagram illustrating a state when a medium is fed.
Figure 12B:
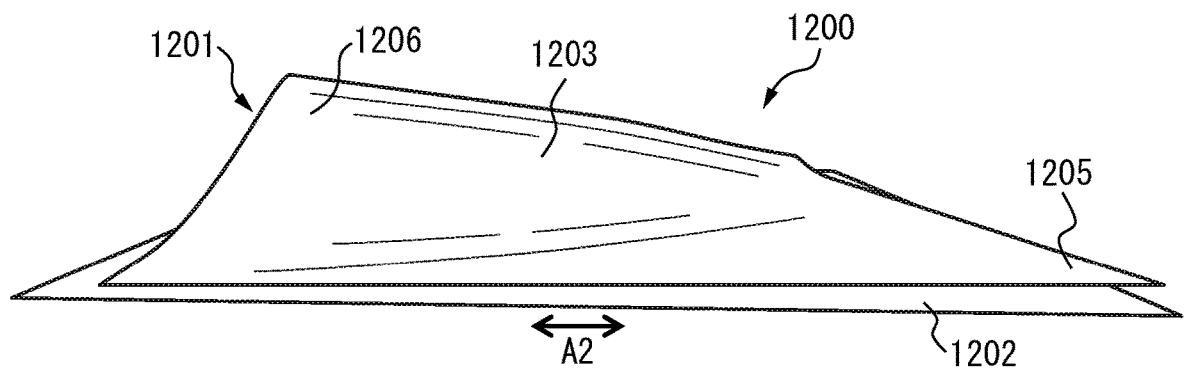
FIG. 12B is a schematic diagram illustrating a state when a medium is fed.
Figure 12C:
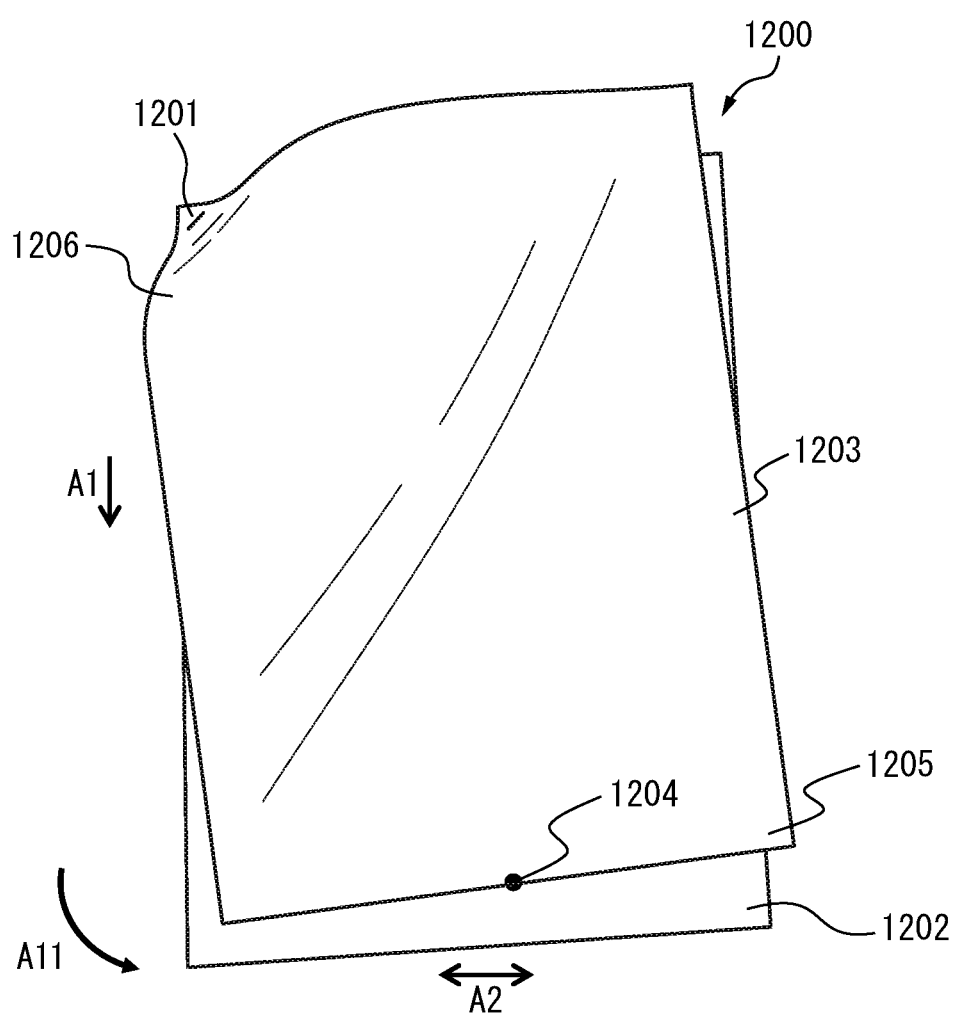
FIG. 12C is a schematic diagram illustrating a state when a medium is fed.
Figure 13A:
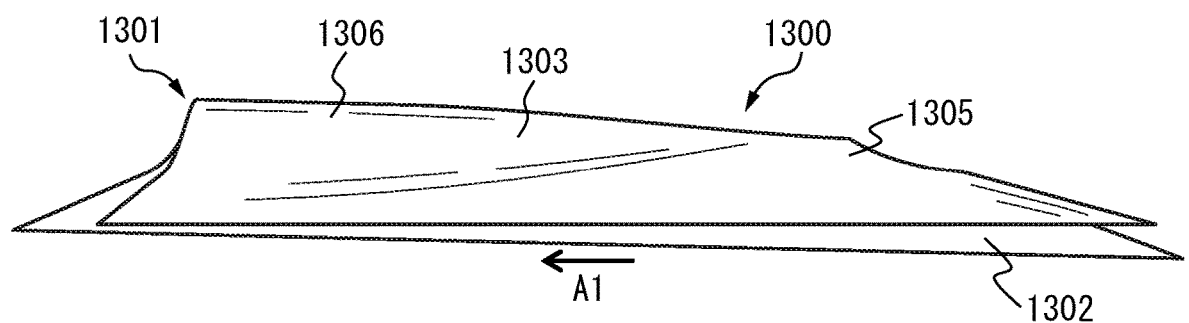
FIG. 13A is a schematic diagram illustrating a state when a medium is fed.
Figure 13B:
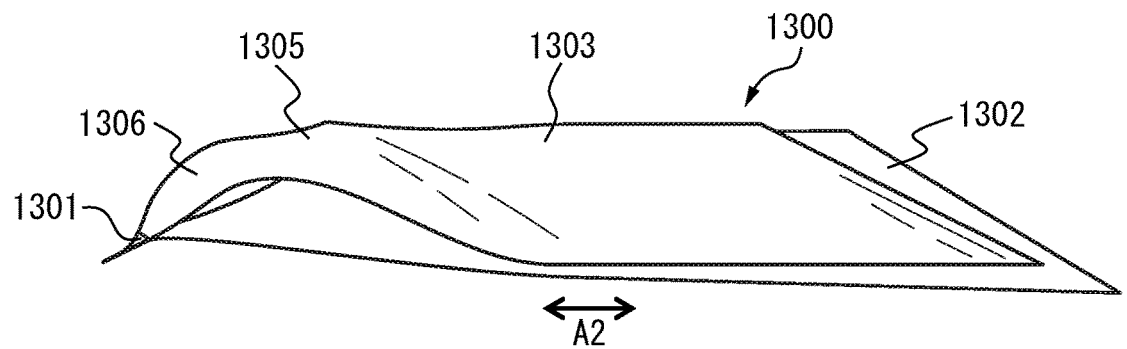
FIG. 13B is a schematic diagram illustrating a state when a medium is fed.
Figure 13C:
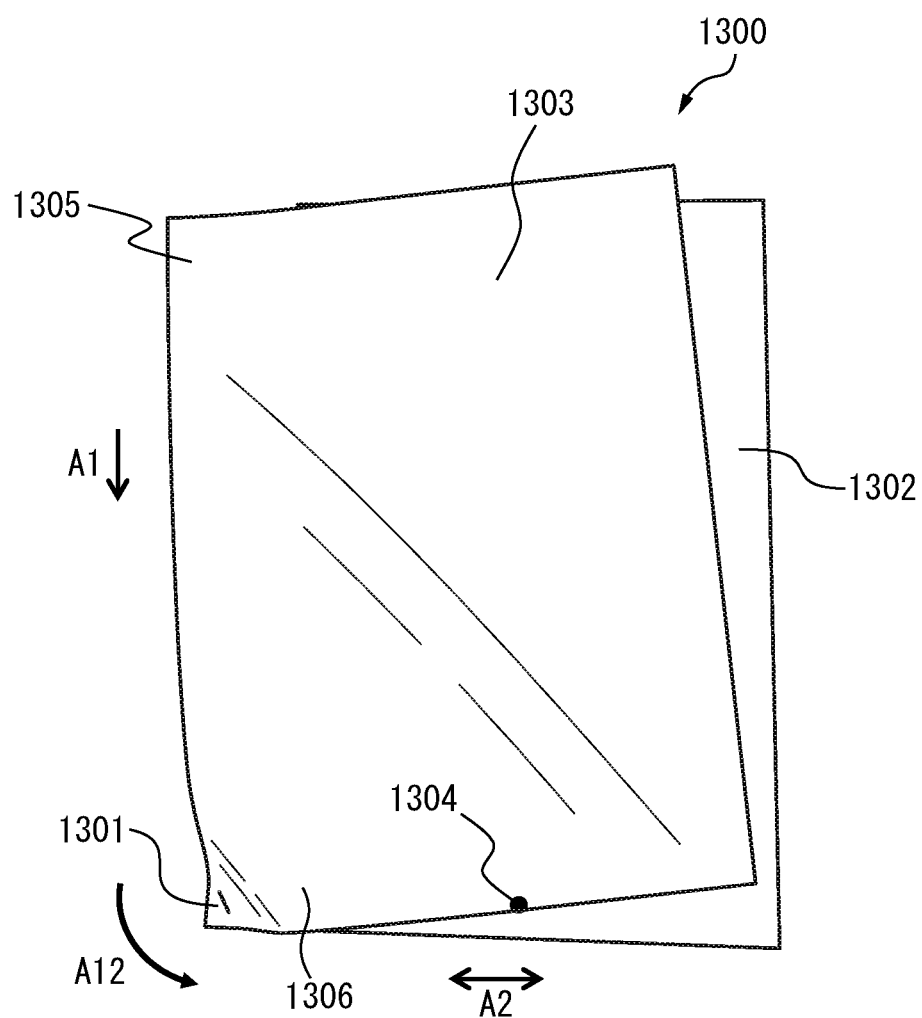
FIG. 13C is a schematic diagram illustrating a state when a medium is fed.
Figure 14:
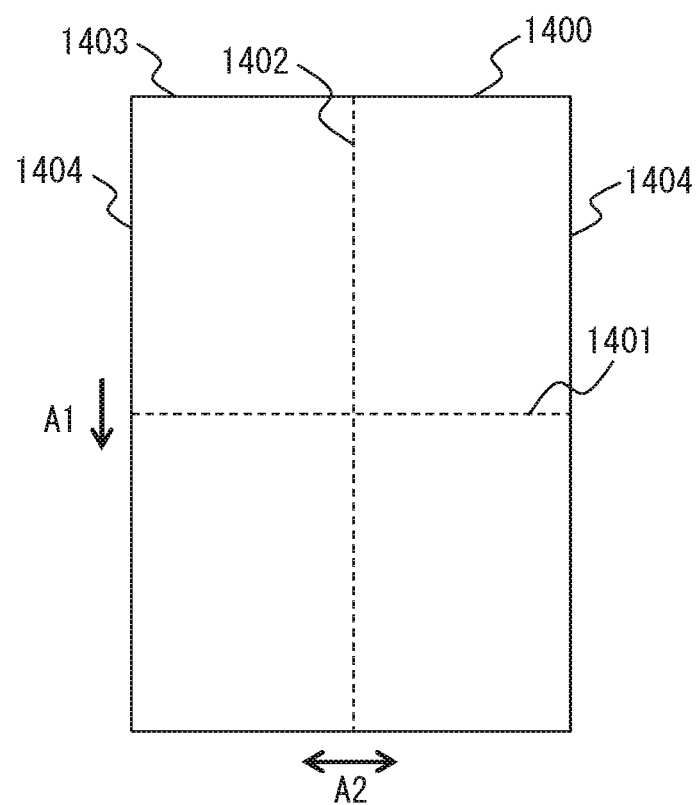
FIG. 14 is a schematic diagram for illustrating a mountain fold and a valley fold.

FIG. 9 is a table illustrating a relationship between the detection result of each change amount and the detection result of the deflection of the medium for each medium type. FIG. 10A to FIG. 13C are schematic diagrams illustrating a state in which a medium folded in two or media bound by a staple is fed. FIG. 14 is a schematic diagram for illustrating a mountain fold and valley fold.

Figure 10A:
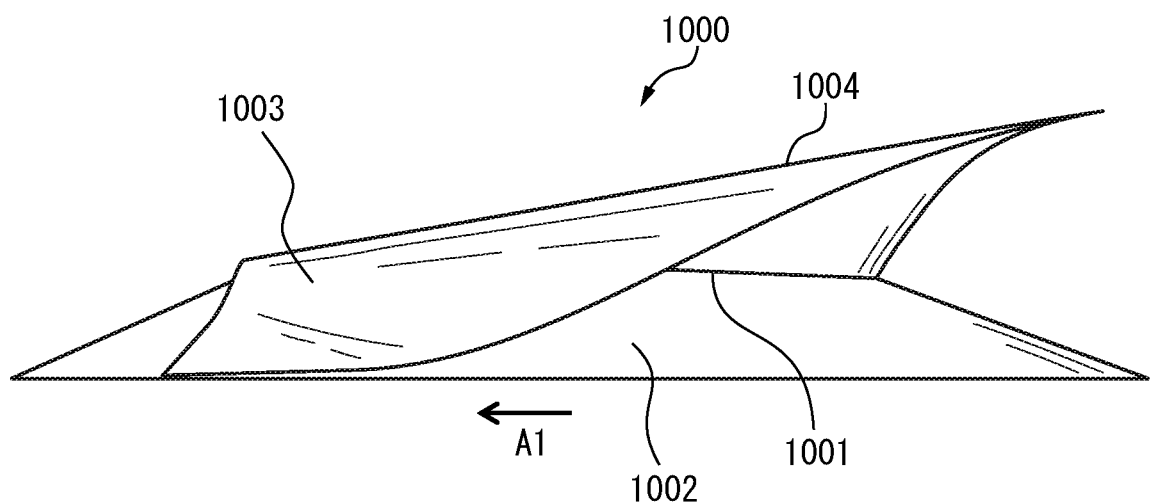
FIG. 10A is a schematic diagram illustrating a state when a medium is fed.
Figure 10B:
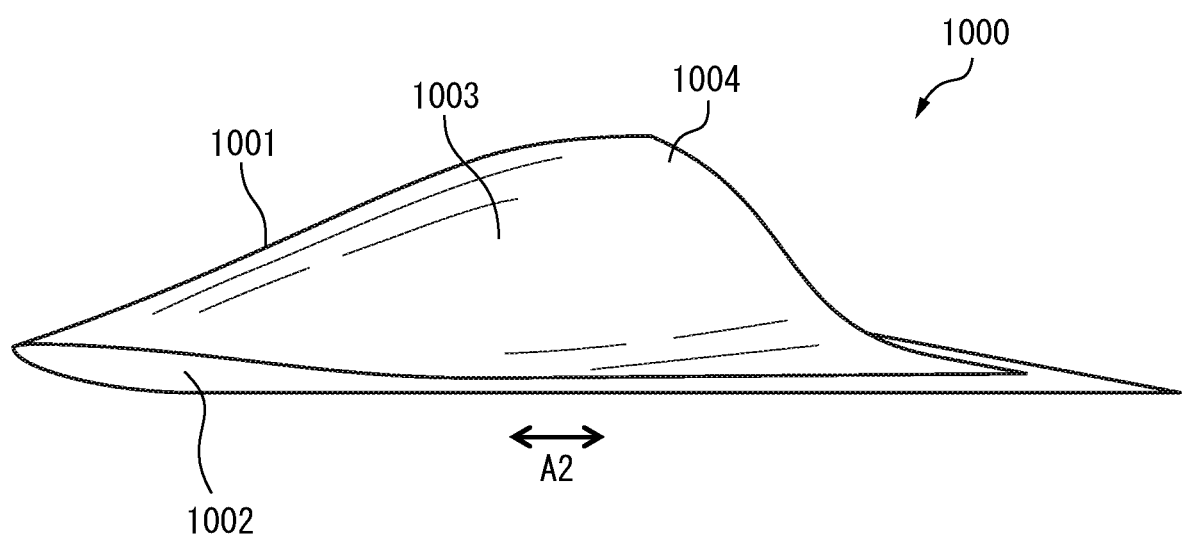
FIG. 10B is a schematic diagram illustrating a state when a medium is fed.

Item 1 in FIG. 9 indicates each detection result when a medium folded in two along the feeding direction A1 or a plurality of media with one end along the feeding direction A1 bound by a staple is fed. FIG. 10A is a schematic diagram of the media 1000 viewed from the side of the medium conveying apparatus 100, and FIG. 10B is a schematic diagram of the media 1000 viewed from the downstream side of the medium conveying apparatus 100. As illustrated in FIG. 10A and FIG. 10B, in the media 1000, one ends 1001 along the feeding direction A1 are bound. Since the feed module of the medium conveying apparatus 100 feeds sequentially the medium placed on the medium tray 103 from the lower side, the lower portion 1002 of the medium 1000 is sent to the downstream side of the feed module, the downstream end of the upper portion 1003 stays the upstream side of the feed module.

In this case, although the upper portion 1003 tries to stay by the feed module, a force toward the downstream side is applied to the bound one ends 1001 by the lower portion 1002, the upstream portion 1004 of the upper portion 1003 is deflected upward. Therefore, as illustrated in item 1 in FIG. 9, the first change amount in the feeding direction A1 is small, the second change amount in the height direction A3 is middle.

Figure 11A:
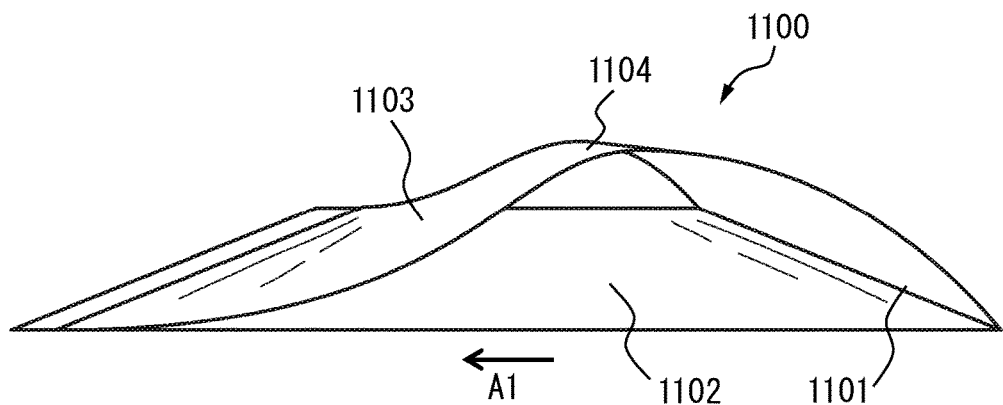
FIG. 11A is a schematic diagram illustrating a state when a medium is fed.
Figure 11B:
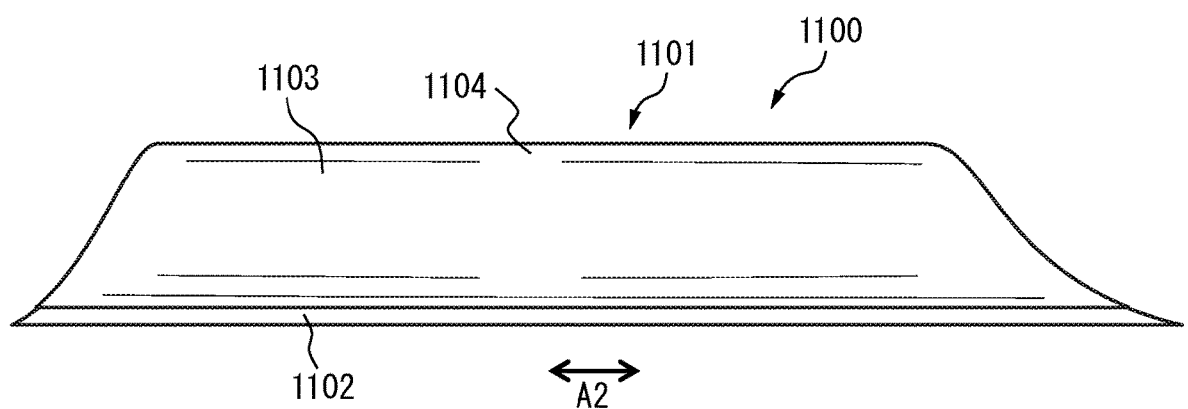
FIG. 11B is a schematic diagram illustrating a state when a medium is fed.

Item 2 of FIG. 9 illustrates each detection result when a medium folded in two along the width direction A2 or a plurality of media with one ends along the width direction A2 bound by a staple is fed in a state in which the bound portions are located on the upstream side. FIG. 11A is a schematic diagram of the media 1100 viewed from the side of the medium conveying apparatus 100, and FIG. 11B is a schematic diagram of the media 1100 viewed from the downstream side of the medium conveying apparatus 100. As illustrated in FIG. 11A and FIG. 11B, in the media 1100, one ends 1101 along the width direction A2 is bound.

In this case, the downstream end of the upper portion 1003 remains by the feed module and does not move downstream. On the other hand, a force toward the downstream side is applied to the bound one ends 1101 by the lower portion 1102, and the central portion 1104 of the upper portion 1103 is deflected upward. Therefore, as illustrated in item 2 in FIG. 9, the first change amount in the feeding direction A1 is almost zero, the second change amount in the height direction A3 is middle.

Item 3 of FIG. 9 illustrates each detection result when a medium folded in two along the width direction A2 or a plurality of media with one ends along the width direction A2 bound by a staple is fed in a state in which the bound portions are located on the downstream side. This medium is smoothly fed to the downstream side of the feed module without being separated by the feed module. Therefore, as illustrated in item 3 in FIG. 9, the first change amount in the feeding direction A1 is large, the second change amount in the height direction A3 and the third change amount in the width direction A2 is almost zero.

Item 4 of FIG. 9 illustrates each detection result when a plurality of media with one corners bound by a staple are fed in a state in which the bound portions are located on the upstream side. FIG. 12A is a schematic diagram of the media 1200 viewed from the side of the medium conveying apparatus 100, FIG. 12B is a schematic diagram of the media 1200 viewed from the downstream side of the medium conveying apparatus 100, and FIG. 12C is a schematic diagram of the medium 1200 viewed from above. As illustrated in FIGS. 12A to 12C, in the media 1200, end portions 1201 that are the upstream side of the feeding direction A1 and are one end side of the width direction A2 are bound.

In this case, a force to rotate in the direction of arrow A11 about the downstream side portion 1204 that remains at the feed module by the lower portion 1202, is applied to the bound end 1201 of the upper portion 1203. Thus, although the upper portion 1203 moves little in the feeding direction A1, the downstream end 1205 on the opposite side of the end 1201 of the upper portion 1203 moves toward the opposite side of the end 1201 in the width direction A2. Further, since a force toward the downstream side by the lower portion 1202 is applied to the end portion 1201, the peripheral portion 1206 of the end portion 1201 of the upper portion 1203 is deflected upward. Therefore, as illustrated in item 4 in FIG. 9, the first change amount in the feeding direction A1 is almost 0, the third change amount in the width direction A2 slightly occurs, the second change amount in the height direction A3 is middle. Incidentally, the change in the width direction A2 tends to occur earlier than the change in the height direction A3.

Item 5 of FIG. 9 illustrates each detection result when a plurality of media with one corners bound by a staple are fed in a state in which the bound portions are located on the downstream side. FIG. 13A is a schematic diagram of the media 1300 viewed from the side of the medium conveying apparatus 100, FIG. 13B is a schematic diagram of the media 1300 viewed from the downstream side of the medium conveying apparatus 100, and FIG. 13C is a schematic diagram of the media 1300 viewed from above. As illustrated in FIGS. 13A to 13C, in the media 1300, end portions 1301 that are the downstream side of the feeding direction A1 and are one end side of the width direction A2 are bound.

In this case, a force to rotate in the direction of arrow A12 by the lower portion 1302 about the downstream side portion 1304 that remains at the feed module, is applied to the bound end 1301 of the upper portion 1303. Thus, although the upper portion 1303 moves only a little in the feeding direction A1, the upstream end 1305 of the end 1301 side of the upper portion 1303 moves toward the end 1301 side in the width direction A2. Further, although the peripheral portion 1306 of the end 1301 of the upper portion 1303 is deflected slightly upward, the deflection is suppressed by the feed module. Therefore, as illustrated in item 5 in FIG. 9, the first change amount in the feeding direction A1 and the third change amount in the width direction A2 slightly occurs, the second change amount in the height direction A3 is almost zero.

Item 6 in FIG. 9 illustrates each detection result when the medium in which the central portion of the feeding direction A1 is mountain folded along the width direction A2 (the medium folded so as to be convex upward) is fed. When the central line 1401 in the feeding direction A1 of the medium 1400 illustrated in FIG. 14 is mountain folded, the medium 1400 is smoothly fed to the downstream side of the feed module without being separated by the feed module during feeding. However, when the medium 1400 is fed, its central portion swells. Therefore, as illustrated in item 6 in FIG. 9, the first change amount in the feeding direction A1 is large, the second change amount in the height direction A3 is middle.

Item 7 in FIG. 9 illustrates each detection result when the medium in which the central portion of the feeding direction A1 is valley folded along the width direction A2 (the medium folded so as to be convex downward) is fed. When the central line 1401 in the feeding direction A1 of the medium 1400 illustrated in FIG. 14 is valley folded, the medium 1400 is smoothly fed to the downstream side of the feed module without being separated by the feed module during feeding. However, when the medium 1400 is fed, its downstream end 1403 rises. Therefore, as illustrated in item 7 in FIG. 9, the first change amount in the feeding direction A1 is large, the second change amount in the height direction A3 is middle.

Item 8 and item 9 in FIG. 9 illustrate each detection result when the medium in which the central portion in the width direction A2 is mountain folded and valley folded along the feeding direction A1 is fed, respectively. When the central line 1402 in the width direction A2 of the medium 1400 illustrated in FIG. 14 is mountain folded or valley folded, the medium 1400 is smoothly fed to the downstream side of the feed module without being separated by the feed module during feeding. Further, the medium 1400 is sandwiched by the feed module to become flat, the central line 1402 and both ends 1404 of the width direction A2 does not swell, during feeding. Therefore, as illustrated in item 8 and item 9 in FIG. 9, the first change amount in the feeding direction A1 is large, the second change amount in the height direction A3 is almost zero.

Therefore, the first threshold value of the first change amount is preferably set to a value between the first change amount in the items 1, 2, 4 and the first change amount in the items 6 to 9, and the second threshold value of the second change amount is preferably set to a value smaller than the second change amount in the items 1, 2, 4. Thus, the medium conveying apparatus 100 can correctly detect the deflection of the medium when the medium folded in two or the bound media is fed along the feeding direction A1 (item 1). Further, the medium conveying apparatus 100 can correctly detect the deflection of the medium even when the medium in which the upstream end is folded in two or bound along the width direction A2 is fed (item 2). Further, the medium conveying apparatus 100 can correctly detect the deflection of the medium even when the media with one bound corners of the upstream side are fed (item 4). On the other hand, the medium conveying apparatus 100 does not erroneously detect the deflection of the medium when the medium mountain folded or valley folded is fed (items 6 to 9).

The third threshold value of the third change amount is preferably set to a value smaller than the third change amount in the items 4 and 5. Thus, the medium conveying apparatus 100 can correctly and early detect the deflection of the medium when the media with one bound corners are fed (items 4 and 5).

Incidentally, when the medium in which the downstream end is folded two or bound along the width direction A2 is fed (item 3), the medium conveying apparatus 100 cannot detect the deflection of the medium, but can detect the multi-feed to stop the feeding of the medium and notify the user of the warning.

As described in detail above, the medium conveying apparatus 100 detects a behavior of the medium, particularly the deflection of the medium, based on the change amount in the feeding direction A1 and the change amount in the height direction A3 of the medium placed on the medium tray 103 to stop the feeding of the medium. Therefore, the medium conveying apparatus 100 can accurately determine whether or not the deflection of the fed medium has occurred, and suitably control the feeding of the medium.

Further, the medium conveying apparatus 100, by using the change amount in the width direction A2 of the medium placed on the medium tray 103, can earlier and reliably detect the deflection of the medium with one bound corner of which the damage is likely to occur. Further, while the medium conveying apparatus 100 prevent the erroneous detection of the deflection of the medium when the medium with the folding line is fed, and can correctly detect the deflection of the medium when the medium folded in two, the stapled media or the tiled medium, etc., is fed. Further, the medium conveying apparatus 100, by stopping feeding the medium based on the state of the medium placed on the medium tray 103, prevent the occurrence of the jam of the medium in advance, and can suppress the occurrence of the damage to the medium. Further, the medium conveying apparatus 100, by monitoring the medium placed on the medium tray 103 from the downstream side by the sensor provided in the upper housing 102, can detect the deflection of the medium with a small number of sensors, and suppress an increase in device size and equipment cost.

Figure 15:
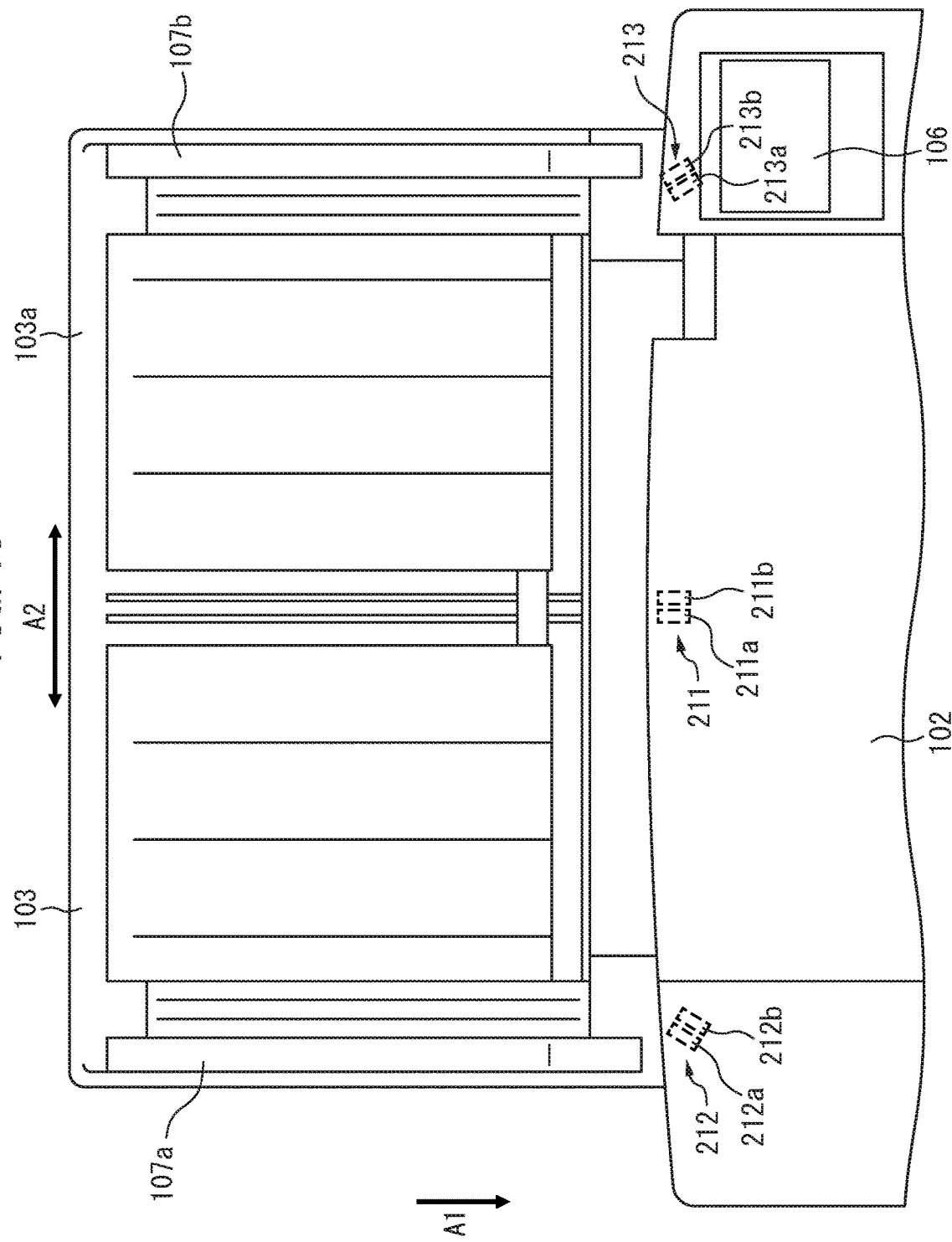
FIG. 15 is a schematic diagram for illustrating another center sensor 211, etc.

FIG. 15 is a schematic diagram for illustrating the center sensor 211, the first side sensor 212 and the second side sensor 213 in the medium conveying apparatus according to another embodiment.

The center sensor 211, the first side sensor 212 and the second side sensor 213, respectively are used in place of the center sensor 111, the first side sensor 112 and the second side sensor 113 of the medium conveying apparatus 100. The center sensor 211, the first side sensor 212 and the second side sensor 213, respectively are located in the arrangement position of the center sensor 111, the first side sensor 112 and the second side sensor 113.

The center sensor 211, the first side sensor 212 and the second side sensor 213 are gesture sensors such as a light sensor. The center sensor 211 includes a light emitter 211a and a light receiver 211b. The light emitter 211a is an example of a light emitting module, and emits light (infrared light) toward the medium tray 103. On the other hand, the light receiver 211b is an example of a light receiving module, and receives light emitted by the light emitter 211a and reflected by the medium tray 103 or a medium placed on the medium tray 103, and detects the received light. The light receiver 211b includes a plurality of light receiving elements arranged one-dimensionally or two-dimensionally, and generates and outputs an intensity pattern indicating a distribution of an intensity of light received by each light receiving element and a time pattern indicating a distribution of the time from the irradiation of light by the light emitter 211a to the reception of light by each light receiving element. The first side sensor 212 includes a light emitter 212a and a light receiver 212b similar to the light emitter 211a and the light receiver 211b. The second side sensor 213 includes a light emitter 213a and a light receiver 213b similar to the light emitter 211a and the light receiver 211b.

Each sensor is located so that the direction of light irradiation faces the upstream side in the feeding direction A1, particularly faces the substantially central position of the medium tray 103 in the width direction A2, and faces the lower side (the placing surface 103a side) in the height direction A3. Each sensor is preferably provided so that reflected light in all areas of the medium of the maximum size supported by the medium conveying apparatus 100 is detected by each sensor when the medium is placed on the medium tray 103. Each sensor is provided so that reflected light in each region in the maximum size medium placed on the medium tray 103, particularly in each region of the upstream end of the medium, is detected by at least any of the sensors.

Each sensor, at regular intervals, emits light toward the medium placed on the medium tray 103, generates and outputs the intensity pattern and the time pattern corresponding to the received light. The center sensor 211 generates a first intensity pattern and a first time pattern, the first side sensor 212 generates a second intensity pattern and a second time pattern, and the second side sensor 213 generates a third intensity pattern and a third time pattern.

The motion detection module acquires the first to third intensity patterns and the first to third time patterns from the center sensor 211, the first side sensor 212 and the second side sensor 213 in step S103 of FIG. 6. The motion detection module stores the acquired first to third intensity patterns and the first to third time patterns in the storage device 140 as the first to third initial intensity patterns and the first to third initial time patterns. Further, in step S201 of FIG. 7, the motion detection module acquires the first to third intensity patterns and the first to third time patterns from the center sensor 211, the first side sensor 212 and the second side sensor 213, and stores them in the storage device 140.

The motion detection module detects the first change amount and the second change amount from the first to third intensity patterns and the first to third initial intensity patterns, in the same manner as in the case of using the first to third images and the first to third initial images. In other words, the motion detection module detects the first change amount and the third change amount by treating the intensity of light in the first to third intensity patterns in the same manner as the brightness in the first to third images.

Further, the motion detection module calculates a distance from each sensor to each reflection position of light in the medium based on the first time pattern and the first initial time pattern. The motion detection module calculates a difference value between the distance calculated from the first initial time pattern and the distance calculated from the latest first time pattern for each element (time) in the pattern, and detects the maximum value, the average value or the median value of the calculated difference value as the second movement amount in the height direction A3. Also, The motion detection module calculates the second movement amount for a combination of the second time pattern and the second initial time pattern, and a combination of the third time pattern and the third initial time pattern, and detects the maximum value, the average value or the median value of each of the calculated second movement amount as the second change amount.

Thus, the motion detection module detects the first change amount, the second change amount and the third change amount, based on information generated by the center sensor 211, the first side sensor 212 and the second side sensor 213. In the case of using the light sensor, similarly to the case of using the imaging sensor, only one or two sensors of the center sensor 211, the first side sensor 212 and the second side sensor 213 may be used. Further, one or more sensors may be used in addition to the center sensor 211, the first side sensor 212 and the second side sensor 213.

The medium conveying apparatus may also use an optical sensor to detect the first change amount and the third change amount. The optical sensor includes a light emitter and a light receiver. Light emitter emits light (infrared light) toward the medium tray 103. On the other hand, the light receiver captures an image corresponding to the intensity of light received at regular intervals, and detects a common portion from the latest image and the previous image. The light receiver detects a moving direction and a moving distance of the conveyed medium based on the change of the position of the detected common portion in the image, and generates and outputs the moving information indicating the detected moving direction and the detected moving distance. The motion detection module acquires the movement information from the optical sensor in step S103 of FIG. 6 and step S201 of FIG. 7, and detects the first change amount and the third change amount from the acquired moving information.

The medium conveying apparatus may also use a dot light projection sensor to detect the second amount of change. The dot light projection sensor includes an infrared emitter and an infrared camera. The infrared emitter emits a plurality of infrared beams toward the medium tray 103. On the other hand, the infrared camera generates and outputs an infrared image corresponding to the intensity of the received infrared light. The motion detection module acquires the infrared images from the dot light projection sensor in step S103 of FIG. 6 and step S201 of FIG. 7. The motion detection module detects the second change amount from the infrared image in the same manner as in the case of detecting the second change amount from the image captured by the imaging sensor.

As described in detail above, the medium conveying apparatus accurately determines whether or not the deflection of the fed medium has occurred, and suitably control the feeding of the medium even when using the light sensor, the optical sensor and/or the dot light projection sensor.

Figure 16:
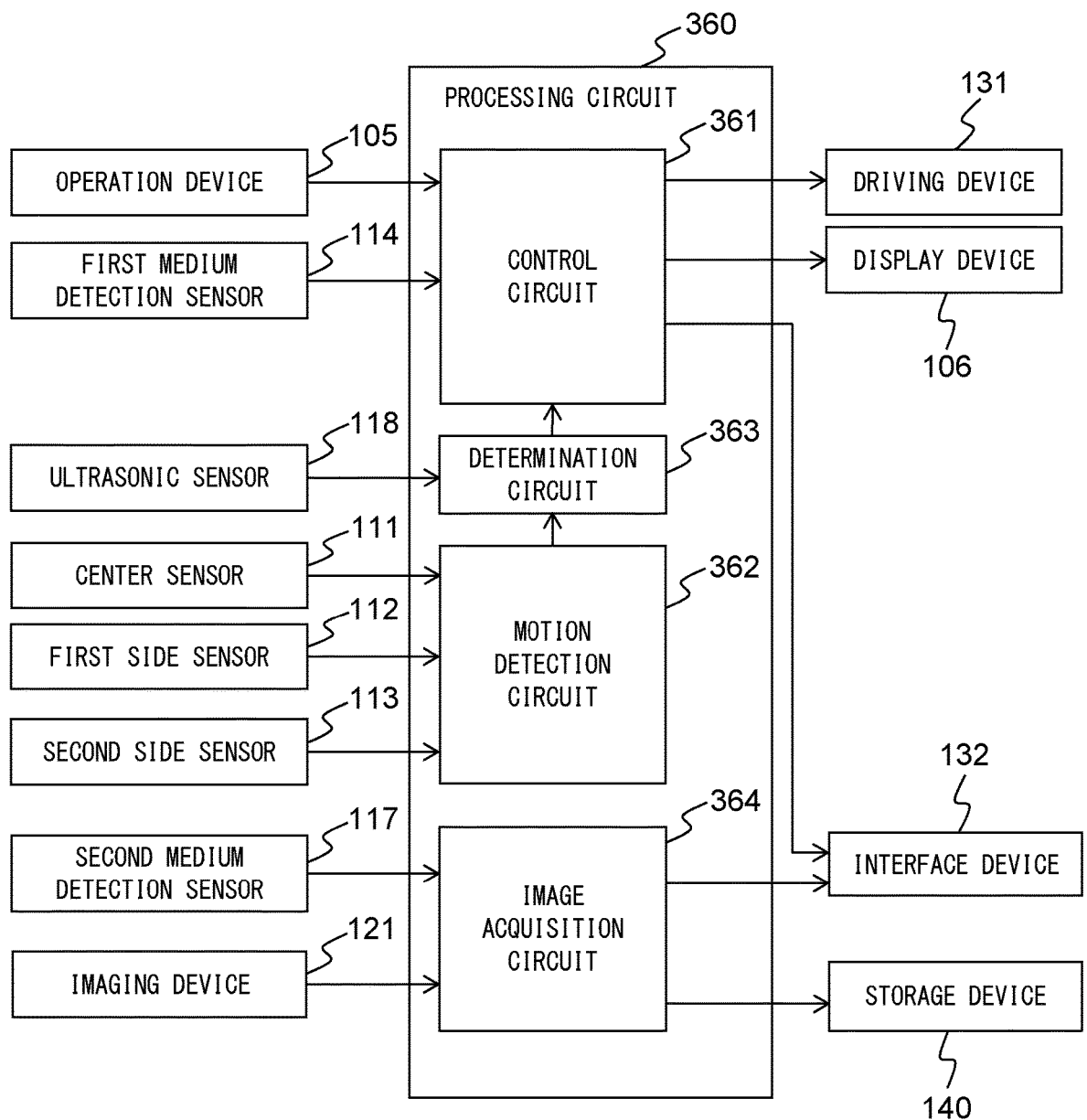
FIG. 16 is a diagram illustrating a schematic configuration of another processing circuit 360.

FIG. 16 is a diagram illustrating a schematic configuration of a processing circuit 360 in a medium conveying apparatus according to yet another embodiment. The processing circuit 360 is used in place of the processing circuit 160 of the medium conveying apparatus 100 and executes the medium reading processing in place of the CPU 150. The processing circuit 360 includes a control circuit 361, a motion detection circuit 362, a determination circuit 363, an image acquisition circuit 364, etc. Note that each unit may be configured by an independent integrated circuit, a microprocessor, firmware, etc.

The control circuit 361 is an example of a control module and has a function similar to the control module 151. The control circuit 361 receives the operation signal from the operation device 105, the first medium detection signal from the first medium detection sensor 114, the determination result of the deflection and the multi-feed of the medium from the determination circuit 363. The control circuit 361 drives the driving device 131 based on each received signal, and stops the feeding of the medium.

The motion detection circuit 362 is an example of a motion detection module and has a similar to the motion detection module 152. The motion detection circuit 362 receives the first to third images from the center sensor 111, the first side sensor 112 and the second side sensor 113. Alternatively, the motion detection circuit 362 receives the first to third intensity patterns and the first to third time patterns from the center sensor 211, the first side sensor 212 and the second side sensor 213. The motion detection circuit 362 detects the first to third change amounts based on the received information and outputs the detection result to the determination circuit 363.

The determination circuit 363 is an example of a determination module has a functions similar to the determination module 153. The determination circuit 363 receives the first to third change amounts from the motion detection circuit 362, determines whether or not the deflection of the medium has occurred based on the received information, and outputs the determination result to the control circuit 361. Further, the determination circuit 363 receives the ultrasonic signal from the ultrasonic sensor 118, determines whether or not the multi-feed of the medium has occurred based on the received ultrasonic signal, and outputs the determination result to the control circuit 361.

The image acquisition circuit 364 is an example of an image acquisition module and has a function similar to the image acquisition module 154. The image acquisition circuit 364 receives the second medium detection signal from the second medium detection sensor 117, the input image from the imaging device 121, and transmits to the information processing apparatus (not shown) through the interface device 132 as well as stores the input image in the storage device 140.

As described in detail above, the medium conveying apparatus accurately determines whether or not the deflection of the fed medium has occurred, and suitably control the feeding of the medium even when using the processing circuit 360.

Figure 17:
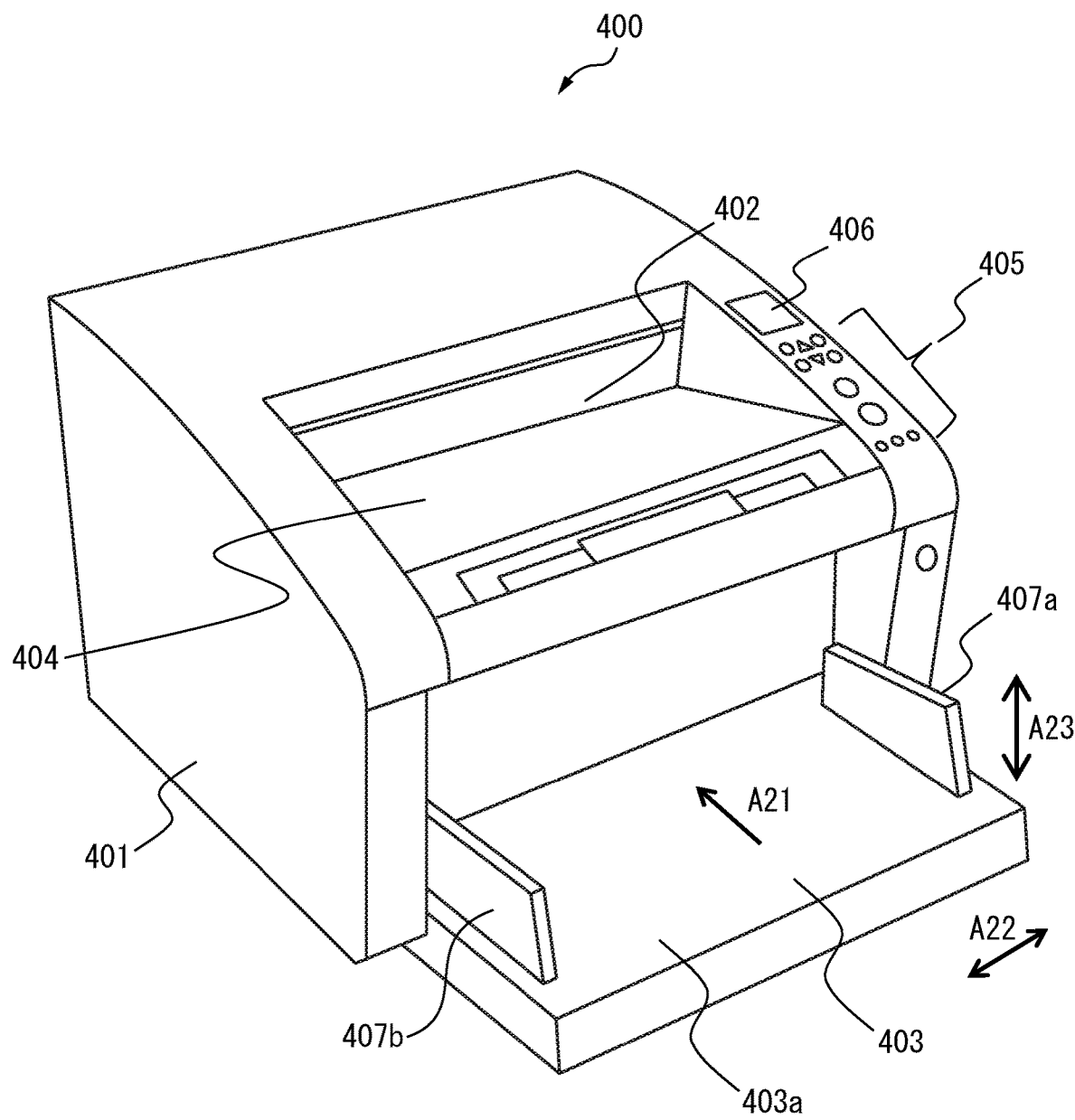
FIG. 17 is a perspective view illustrating another medium conveying apparatus 400.

FIG. 17 is a perspective view illustrating a medium conveying apparatus 400 according to still another embodiment. The medium conveying apparatus 400 is the same device as the medium conveying apparatus 100. However, the medium conveying apparatus 400 sequentially feeds the medium placed on the medium tray 403 from the upper side.

The medium conveying apparatus 400 includes a lower housing 401, an upper housing 402, a medium tray 403, an ejection tray 404, an operation device 405 and a display device 406, etc. The lower housing 401, the upper housing 402, the medium tray 403, the ejection tray 404, the operation device 405 and the display device 406, has the same function as the lower housing 101, the upper housing 102, the medium tray 103, the ejection tray 104, the operation device 105 and the display device 106, respectively.

However, the medium tray 403 is provided on a side surface on the medium supply side of the lower housing 401 so as to be movable in the height direction A23 perpendicular to the placing surface 403a so that the fed medium is placed on the placing surface 403a. The medium tray 403 has side guides 407a and 407b movably provided on the placing surface 403a in the width direction A22 perpendicular to the feeding direction A21 of the medium to regulate the width direction of the medium. The ejection tray 404 is formed on the upper housing 402 so as to hold the ejected medium.

Figure 18:
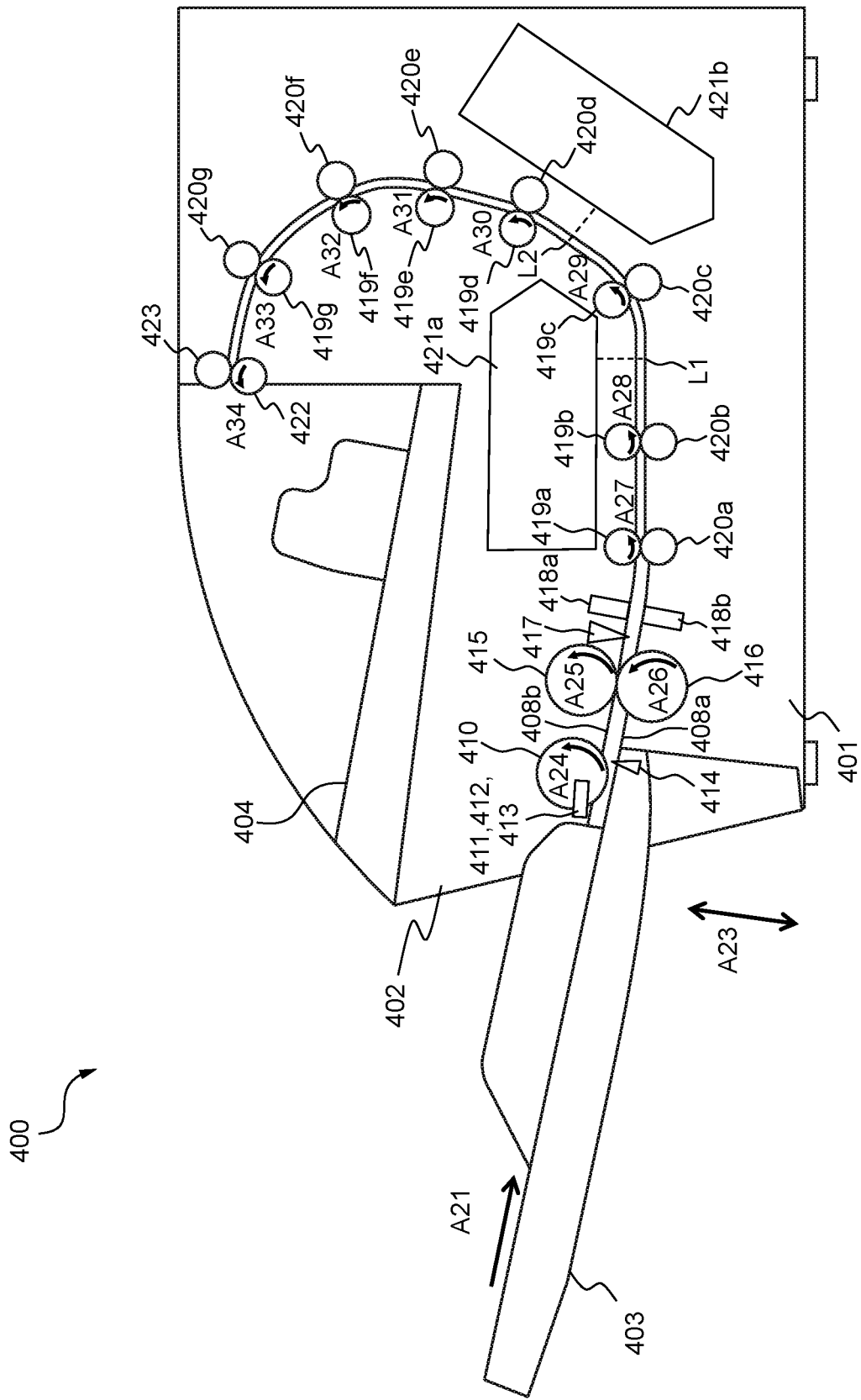
FIG. 18 is a diagram for illustrating a conveyance path inside the medium conveying apparatus 400.

FIG. 18 is a diagram for illustrating a conveyance path inside the medium conveying apparatus 400.

The conveyance path inside the medium conveying apparatus 400, a pick roller 410, a center sensor 411, a first side sensor 412, a second side sensor 413, a first medium detection sensor 414, a feed roller 415, a brake roller 416, a second medium detection sensor 417, an ultrasonic transmitter 418a, an ultrasonic receiver 418b, conveyance rollers 419a to 419g, conveyance driven rollers 420a to 420g, a first imaging device 421a, a second imaging device 421b, a discharge roller 422 and a discharge driven roller 423, etc. The numbers of each roller is not limited to one, and may be plural. Hereinafter, the first imaging device 421a and the second imaging device 421b may be collectively referred to as an imaging device 421. The ultrasonic transmitter 418a and the ultrasonic receiver 418b may be collectively referred to as an ultrasonic sensor 418.

A top surface of the lower housing 401 forms a lower guide 408a of a conveyance path of a medium, and a bottom surface of the upper housing 102 forms an upper guide 408b of the conveyance path of a medium. Each sensor and the imaging device has the same configuration and function as each sensor and the imaging device of the medium conveying apparatus 100.

The pick roller 410 is provided in the upper housing 402, and comes into contact with the medium placed on the medium tray 403 lifted to substantially the same height as the medium conveyance path, to feed the medium toward the downstream side.

The feed roller 415 is provided on the upper housing 402, and the brake roller 416 is provided on the lower housing 401 so as to face the feed roller 415. The feed roller 415 and the brake roller 416 are an example of the feed module to feed by separating the medium placed on the medium tray 403, sequentially feeds the medium placed on the medium tray 403 from the upper side.

The medium placed on the medium tray 403 is conveyed in the feeding direction A21 between the lower guide 408a and the upper guide 408b by the pick roller 410 and the feed roller 415 rotating in directions of arrows A24 and A25 in FIG. 18, respectively. The brake roller 416 rotates in direction of an arrow A26 when the medium is fed. By the working of the feed roller 415 and the brake roller 416, when a plurality of media are placed on the medium tray 403, only a medium in contact with the feed roller 415 out of the media placed on the medium tray 403, is separated.

The medium is fed to the imaging position L1 of the first imaging device 421a by the conveyance rollers 419a to 419b rotating in directions of arrows A27 to A28, respectively, while being guided by the lower guide 408a and the upper guide 408b. Thereafter, the medium is fed between the conveyance roller 419c and the conveyance driven roller 420c, and fed to the imaging position L2 of the second imaging device 421b by the conveyance roller 419c rotating in direction of an arrow A29. The media read by each imaging device 421 is ejected onto the ejection tray 404 by the conveyance rollers 419d to 419g and the discharge rollers 422 rotating in directions of arrows A30 to A34, respectively.

FIG. 19 is a schematic diagram for illustrating the center sensor 411, the first side sensor 412 and the second side sensor 413. FIG. 19 is a schematic diagram of the upstream side of the medium conveying apparatus 400 from above.

As illustrated in FIG. 19, arrangement positions of the center sensor 411, the first side sensor 412 and the second side sensor 413, are same as the center sensor 111, the first side sensor 112 and the second side sensor 113 of the medium conveying apparatus 100, respectively.

Each sensor is located so that the imaging direction (lens optical axis) faces the upstream side in the feeding direction A21, in particular, faces the substantially central position of the medium tray 403 in the width direction A22, and faces the lower side (placing surface 403a side) in the height direction A23. Particularly, the center sensor 411 is located so that the entire medium placed on the medium tray 403 is included in the imaging range R41 in the width direction A22. The first side sensor 412 is located so that a region on the one side guide 407a side of the medium placed on the medium tray 403 is included in the imaging range R42. The second side sensor 413 is located so that a region on the other side guide 407b side of the medium placed on the medium tray 403 is included in the imaging range R43.

Similar to the medium conveying apparatus 100, the medium conveying apparatus 400 further includes the driving device 131, the interface device 132, the storage device 140, the CPU 150 and the processing circuit 160, etc., in addition to the configuration described above (refer to FIG. 4). The storage device 140 stores the control program 141, the motion detection program 142, the determination program 143, and the image acquisition program 144, etc. The CPU 150 functions as the control module 151, the motion detection module 152, the determination module 153 and the image acquisition module 154 (refer to FIG. 5). Further, the medium conveying apparatus 400 executes the medium read processing (refer to FIG. 6) and the determination processing (see FIG. 7).

Similar to the medium conveying apparatus 100, one, two or more sensors may be used in the medium conveying apparatus 400 as sensors to detect the change amount. Further, a gesture sensor such as a light sensor, an optical sensor and/or a dot light projection sensor may be used as a sensor to detect the change amount. Further, the medium reading processing and the determination processing may be executed by the processing circuit 360.

FIG. 20 is a table illustrating a relationship between the detection result of each change amount and the detection result of the deflection of the medium in the medium conveying apparatus 400 for each medium type. FIGS. 21A to 24C are schematic diagrams illustrating a state in which a medium folded in two or media bound by a staple is fed in the medium conveying apparatus 400.

Figure 21A:
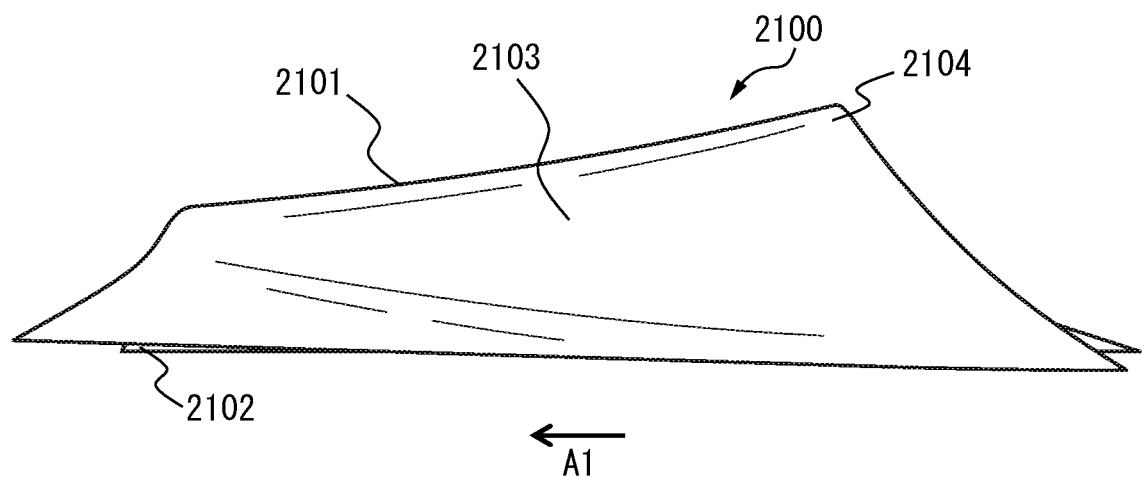
FIG. 21A is a schematic diagram illustrating a state when a medium is fed.
Figure 21B:
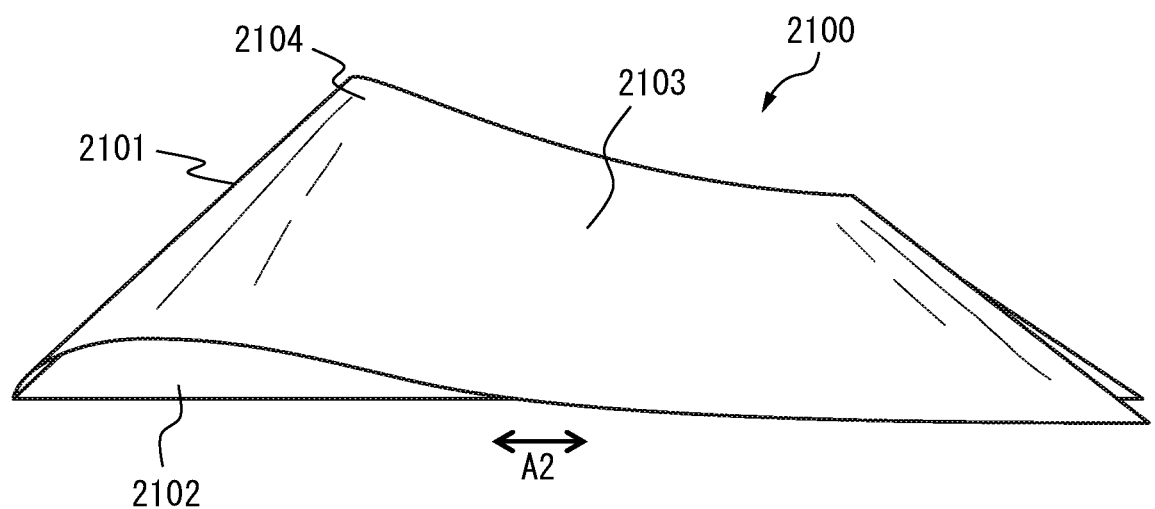
FIG. 21B is a schematic diagram illustrating a state when a medium is fed.

Item 1 in FIG. 20 illustrates each detection result when a medium folded in two along the feeding direction A21 or a plurality of media with one ends along the feeding direction A21 bound by a staple is fed. FIG. 21A is a schematic diagram of the medium 2100 viewed from the side of the medium conveying apparatus 400, and FIG. 21B is a schematic diagram of the medium 2100 viewed from the downstream side of the medium conveying apparatus 400. As illustrated in FIGS. 21A and 21B, in the medium 2100, one end 2101 along the feeding direction A21 is bound. Since the feed module of the medium conveying apparatus 400 feeds sequentially the medium placed on the medium tray 403 from the upper side, the upper portion 2103 of the medium 2100 is conveyed to the downstream side of the feed module, the lower portion 2102 stays upstream side of the feed module.

In this case, although the upper portion 2103 moves toward the feeding direction A1, the lower portion 2102 stays by the feed module. Therefore, the upstream portion 2104 of the upper portion 2103 is deflected upward, by being pulled by the bound one end 2101. Therefore, as illustrated in item 1 in FIG. 20, the first change amount in the feeding direction A1 and the second change amount in the height direction A3 is middle.

Figure 22A:
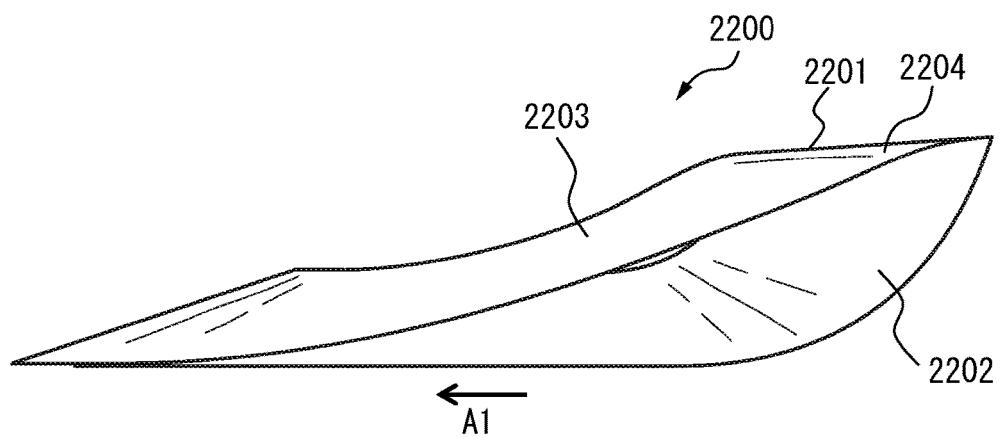
FIG. 22A is a schematic diagram illustrating a state when a medium is fed.
Figure 22B:
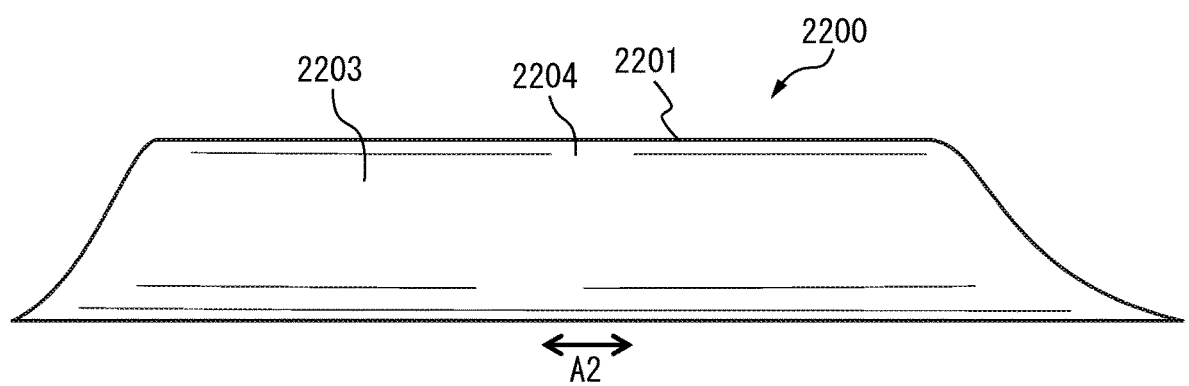
FIG. 22B is a schematic diagram illustrating a state when a medium is fed.

Item 2 in FIG. 20 illustrates each detection result when a medium folded in two along the width direction A22 or a plurality of media with one end along the width direction A22 bound by a staple is fed in a state in which the bound portion is located on the upstream side. FIG. 22A is a schematic diagram of the medium 2200 viewed from the side of the medium conveying apparatus 400, and FIG. 22B is a schematic diagram of the medium 2200 viewed from the downstream side of the medium conveying apparatus 400. As illustrated in FIGS. 22A and 22B, in the medium 2200, one end 2201 along the width direction A22 is bound.

In this case, although the upper portion 2203 moves toward the feeding direction A1, the lower portion 2202 stays by the feed module. Therefore, the upstream portion 2204 of the upper portion 2203 is deflected upward by being pulled by the bound one end 2201. Therefore, as illustrated in item 2 in FIG. 20, the first change amount in the feeding direction A1 is middle, and the second change amount in the height direction A3 is large.

Item 3 in FIG. 20 illustrates each detection result when a medium folded in two along the width direction A22 or a plurality of media with one end along the width direction A22 bound by a staple is fed in a state in which the bound portion is located on the downstream side. This medium is smoothly fed to the downstream side of the feed module without being separated by the feed module. Therefore, as illustrated in item 3 in FIG. 20, the first change amount in the feeding direction A21 is large, the second change amount in the height direction A23 and the third change amount in the width direction A22 are almost zero.

Figure 23A:
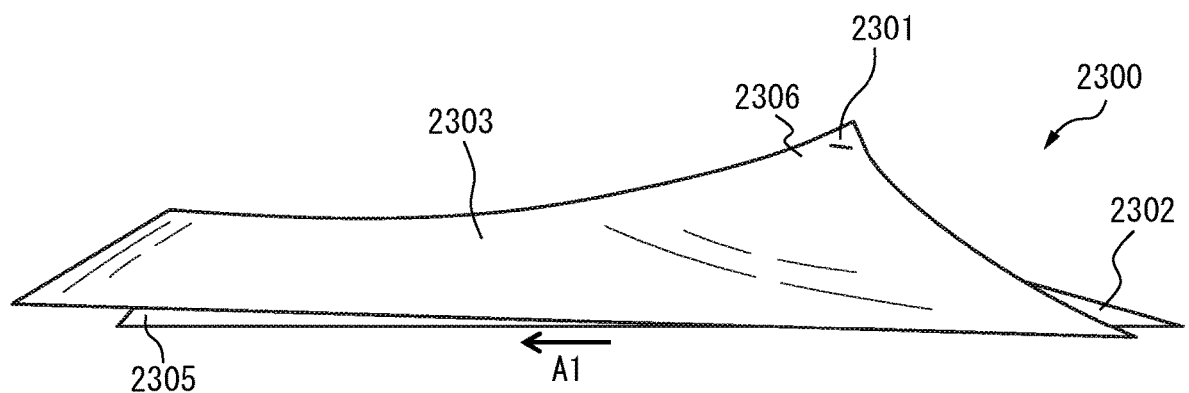
FIG. 23A is a schematic diagram illustrating a state when a medium is fed.
Figure 23B:
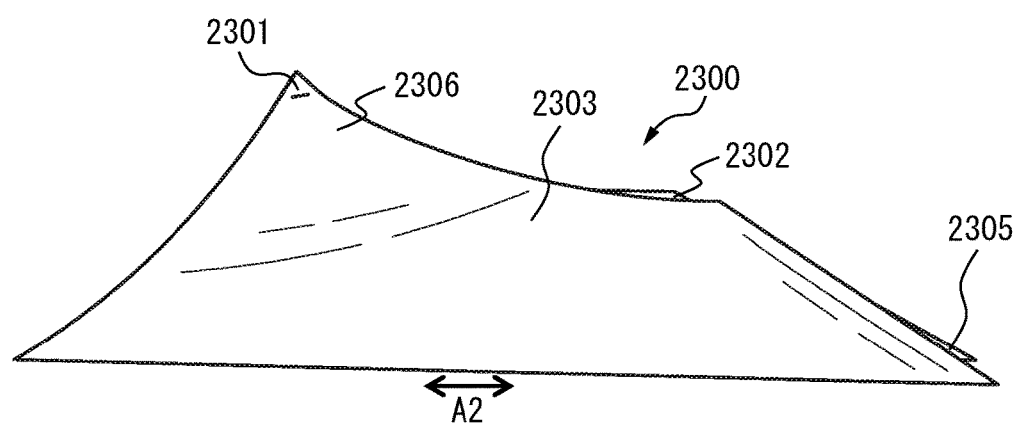
FIG. 23B is a schematic diagram illustrating a state when a medium is fed.
Figure 23C:
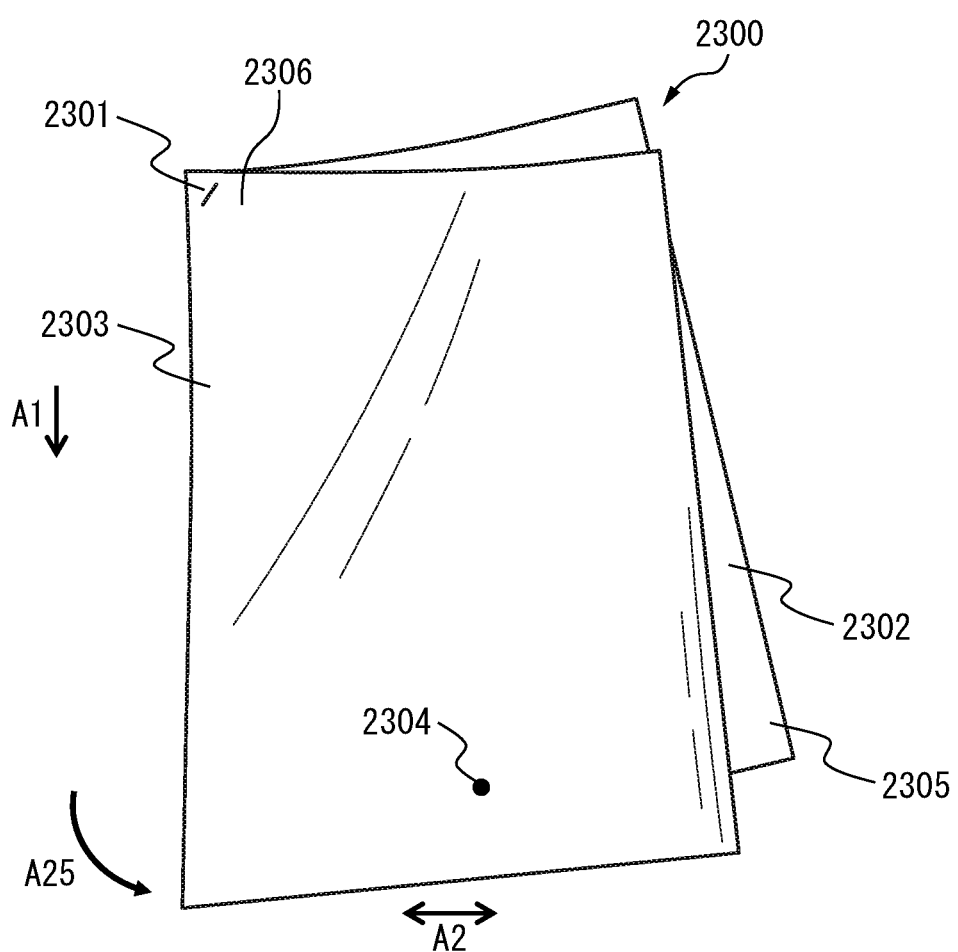
FIG. 23C is a schematic diagram illustrating a state when a medium is fed.

Item 4 in FIG. 20 illustrates each detection result when a plurality of media with one corners bound by a staple are fed in state in which the bound portions are located on the upstream side. FIG. 23A is a schematic diagram of the media 2300 viewed from the side of the medium conveying apparatus 400, FIG. 23B is a schematic diagram of the media 2300 viewed from the downstream side of the medium conveying apparatus 400, and FIG. 23C is a schematic diagram of the media 2300 viewed from above. As illustrated in FIGS. 23A to 23C, in the media 2300, end portions 2301 that are an upstream side of the feeding direction A21 and are one end side of the width direction A22 are bound.

In this case, the upper portion 2303 moves toward the feeding direction A1, and a force to rotate in direction of an arrow A25 by the upper portion 2303 about the downstream side portion 2304 which remains at the feed module is applied to the bound end 2301 of the lower portion 2302. Thus, the downstream end 2305 on the opposite side of the end 2301 of the lower portion 2302 moves toward the opposite side of the end 2301 in the width direction A22. Further, by the end 2301 pulled by the lower portion 2302, the peripheral portion 2306 of the end portion 2301 of the upper portion 2303 is deflected upward. Therefore, as illustrated in item 4 in FIG. 20, the first change amount in the feeding direction A1 is middle, the third change amount in the width direction A2 slightly occurs, and the second change amount in the height direction A3 is large. Incidentally, the change in the width direction A2 tends to occur earlier than the change in the height direction A3.

Figure 24A:
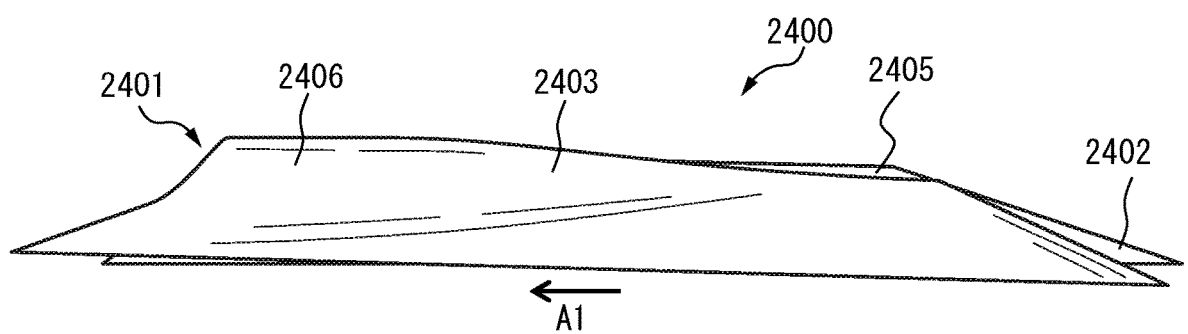
FIG. 24A is a schematic diagram illustrating a state when a medium is fed.
Figure 24B:
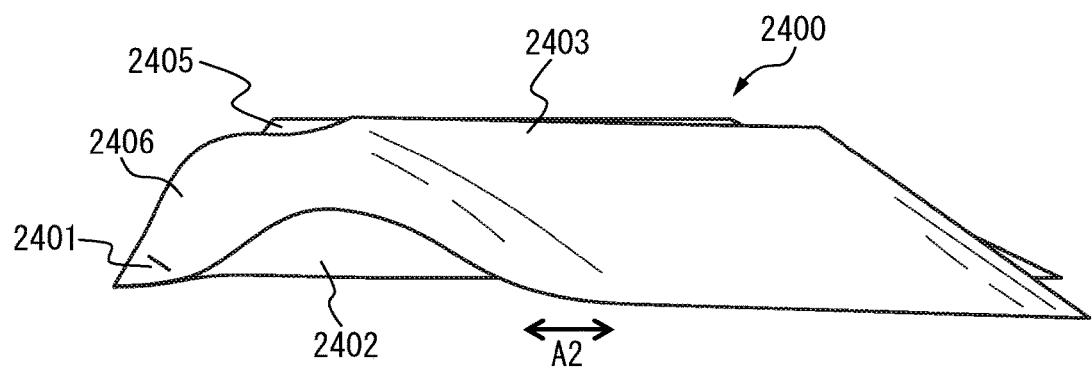
FIG. 24B is a schematic diagram illustrating a state when a medium is fed.
Figure 24C:
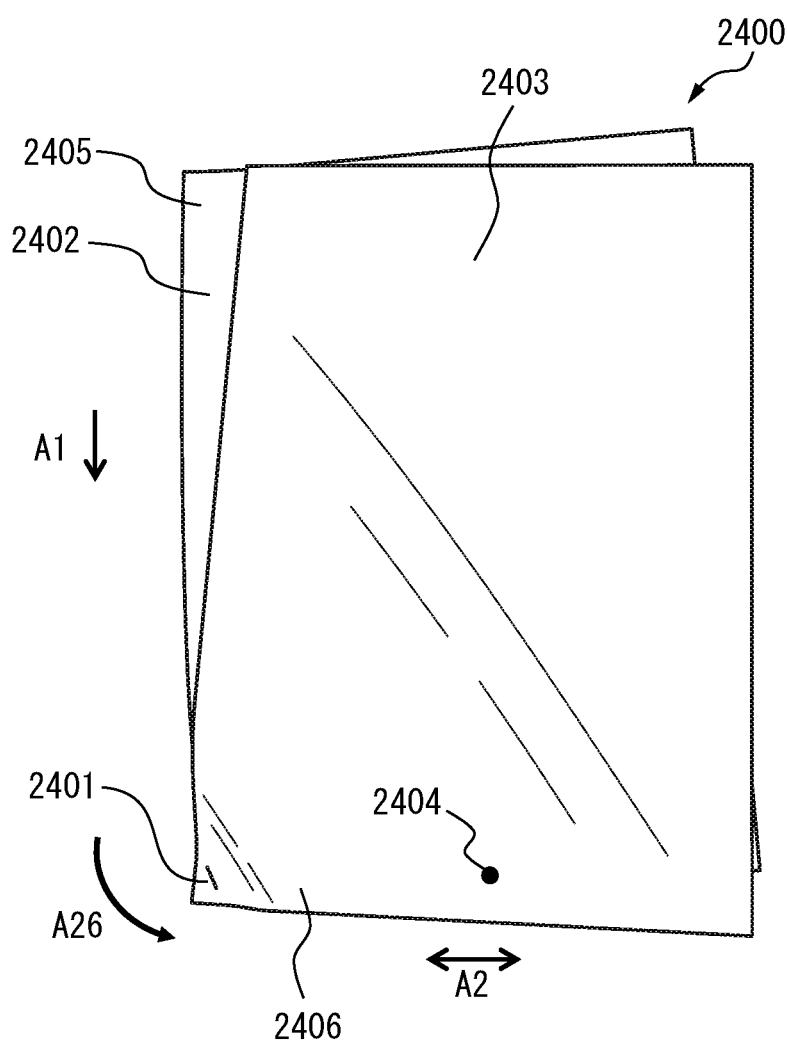
FIG. 24C is a schematic diagram illustrating a state when a medium is fed.

Item 5 in FIG. 20 illustrates each detection result when a plurality of media with one corners bound by a staple are fed in a state in which the bound portions are located on the downstream side. FIG. 24A is a schematic diagram of the media 2400 viewed from the side of the medium conveying apparatus 400, FIG. 24B is a schematic diagram of the media 2400 viewed from the downstream side of the medium conveying apparatus 400, and FIG. 24C is a schematic diagram of the media 2400 viewed from above. As illustrated in FIGS. 24A to 24C, in the media 2400, the end portions 2401 that are the downstream side of the feeding direction A21 and are one end side of the width direction A22 are bound.

In this case, the upper portion 2403 moves toward the feeding direction A1, and a force to rotate in direction of an arrow A26 by the upper portion 2403 about the downstream side portion 2404 which remains at the feed module is applied to the bound end 2401 of the lower portion 2402. Therefore, the upstream end 2405 of the end 2401 side of the lower portion 2402 moves toward the end 2401 side in the width direction A2. Also, although the peripheral portion 2406 of the end portion 2401 of the upper portion 2403 is slightly deflected upward by the end 2401 pulled by the lower portion 2402, the deflection is suppressed by the feed module. Therefore, as illustrated in item 5 in FIG. 20, the first change amount in the feeding direction A21 and the third change amount in the width direction A22 are middle, the second change amount in the height direction A23 is almost zero.

Item 6 in FIG. 20 illustrates each detection result when the medium in which the central portion of the feeding direction A21 is mountain folded along the width direction A22 is fed. This medium is smoothly fed to the downstream side of the feed module without being separated by the feed module. However, when this medium is fed, its central portion swells. Therefore, as illustrated in item 6 in FIG. 20, the first change amount in the feeding direction A21 is large, and the second change amount in the height direction A23 is middle.

Item 7 in FIG. 20 illustrates each detection result when the medium in which the central portion of the feeding direction A21 is valley folded along the width direction A22 is fed. This medium is smoothly fed to the downstream side of the feed module without being separated by the feed module. However, when the medium is fed, its downstream end rises. Therefore, as illustrated in item 7 in FIG. 20, the first change amount in the feeding direction A21 is large, the second change amount in the height direction A23 is middle.

Item 8 and item 9 in FIG. 20 illustrate the respective detection results when the medium in which the central portion of the width direction A22 is mountain folded and valley folded along the feeding direction A21 is fed. These media are smoothly fed to the downstream side of the feed module without being separated by the feed module. Further, these media are sandwiched by the feed module to become flat, the central portion and both ends of the width direction A22 does not swell, during feeding. Therefore, as illustrated in item 8 and item 9 in FIG. 20, the first change amount in the feeding direction A21 is large, the second change amount in the height direction A23 is almost zero.

Therefore, the first threshold value of the first change amount is preferably set to a value between the first change amount in the items 1, 2, 4 and the first change amount in the items 6 to 9, and the second threshold value of the second change amount is preferably set to a value smaller than the second change amount in the items 1, 2, 4. Thus, the medium conveying apparatus 400 can correctly detect the deflection of the medium when the medium folded in two or the bound media is fed along the feeding direction A21 (item 1). Further, the medium conveying apparatus 400 can correctly detect the deflection of the medium even when the medium in which the upstream end is folded in two or bound along the width direction A22 is fed (item 2). Further, the medium conveying apparatus 400 can correctly detect the deflection of the medium even when the media with one bound corners of the upstream side are fed (item 4). On the other hand, the medium conveying apparatus 400 does not erroneously detect the deflection of the medium when the medium mountain folded or valley folded is fed (items 6 to 9).

The third threshold value of the third change amount is preferably set to a value smaller than the third change amount in the items 4 and 5. Thus, the medium conveying apparatus 400 can correctly and early detect the deflection of the medium when the media with one bound corners are fed (items 4 and 5).

Incidentally, when the medium in which the downstream end is folded in two or bound along the width direction A22 is fed (item 3), the medium conveying apparatus 400 cannot detect the deflection of the medium, but can detect the multi-feed to stop the feeding of the medium and notify the user of the warning.

As described in detail above, the medium conveying apparatus 400 accurately determine whether or not the deflection of the fed medium has occurred, and suitably control the feeding of the medium, even when sequentially feeding the medium placed on the medium tray 403 from the upper side.

REFERENCE SIGNS LIST 100, 400 Medium Conveying Apparatus
103, 403 Medium Tray
111, 411 Center Sensor
112, 412 First Side Sensor
113, 413 Second Side Sensor
115, 415 Feed Roller
116, 416 Brake Roller
151 Control Module
152 Motion Detection Module
153 Determination Module

The invention claimed is:

1. A medium conveying apparatus, comprising:
   a medium tray;
   a feed roller to feed a medium placed on the medium tray;
   a processor to
      detect a medium movement change amount in a predetermined time in a feeding direction of the medium placed on the medium tray and a medium height change amount in the predetermined time in a direction perpendicular to a placing surface of the medium tray during feeding of the medium, respectively,
      determine that a deflection of the medium has occurred and stop feeding the medium when the medium movement change amount is less than a first threshold value and the medium height change amount is equal to or more than a second threshold value, and not determine that a deflection of the medium has occurred and not stop feeding the medium when the medium movement change amount is equal to or more than the first threshold value or when the medium height change amount is less than the second threshold value.

2. The medium conveying apparatus according to claim 1, wherein
   the processor further detects a third change amount of the medium placed on the medium tray in a direction parallel to the placing surface of the medium tray and perpendicular to the feeding direction, and wherein
   the processor further determines that the deflection of the medium has occurred when the third change amount is equal to or more than a third threshold value.

3. The medium conveying apparatus according to claim 1, further comprising an imaging sensor, wherein
   the processor detects the medium movement change amount and the medium height change amount, based on an image generated by the imaging sensor.

4. The medium conveying apparatus according to claim 1, further comprising a light sensor including a light emitter to emit light and a light receiver to detect a received light, wherein
   the processor detects the medium movement change amount and the medium height change amount, based on information generated by the light sensor.

5. The medium conveying apparatus according to claim 1, wherein the feed roller sequentially feeds the medium placed on the medium tray from a lower side.

6. The medium conveying apparatus according to claim 1, wherein the feed roller sequentially feeds the medium placed on the medium tray from an upper side.

7. The medium conveying apparatus according to claim 1, wherein the processor notifies a user of a warning according to the determination result.

8. The medium conveying apparatus according to claim 1, further comprising a sensor for detecting an actual movement amount of the medium placed on the medium tray, wherein
   the processor detects the medium movement change amount and the medium height change amount, based on a detection result by the sensor.

9. A control method of a medium conveying apparatus, the method comprising:
   feeding a medium placed on a medium tray;
   detecting a medium movement change amount in a predetermined time in a feeding direction of the medium placed on the medium tray and a medium height change amount in the predetermined time in a direction perpendicular to a placing surface of the medium tray during feeding of the medium, respectively;
   determining that a deflection of the medium has occurred and stopping feeding the medium when the medium movement change amount is less than a first threshold value and the medium height change amount is equal to or more than a second threshold value, and not determining that a deflection of the medium has occurred and not stopping feeding the medium when the medium movement change amount is equal to or more than the first threshold value or when the medium height change amount is equal to or more than the second threshold value.

10. The method according to claim 9, further comprising:
    detecting a third change amount of the medium placed on the medium tray in a direction parallel to the placing surface of the medium tray and perpendicular to the feeding direction; and
    determining that the deflection of the medium has occurred when the third change amount is equal to or more than a third threshold value.

11. The method according to claim 9, wherein the medium movement change amount and the medium height change amount are detected, based on an image generated by an imaging sensor.

12. The method according to claim 9, wherein the medium movement change amount and the medium height change amount are detected, based on information generated by a light sensor including a light emitter to emit light and a light receiver to detect a received light.

13. The method according to claim 9, wherein the medium placed on the medium tray is sequentially fed from a lower side.

14. The method according to claim 9, wherein the medium movement change amount and the medium height change amount are detected, based on a detection result by a sensor for detecting an actual movement amount of the medium placed on the medium tray.

15. A computer-readable, non-transitory medium storing a computer program, wherein the computer program causes a medium conveying apparatus including a medium tray, a feed roller to feed a medium placed on the medium tray, and a motion detection module to detect a medium movement change amount in a predetermined time in a feeding direction of the medium placed on the medium tray and a medium height change amount in the predetermined time in a direction perpendicular to a placing surface of the medium tray during feeding of the medium, respectively, to execute a process, the process comprising:
    determining that a deflection of the medium has occurred and stopping feeding the medium when the medium movement change amount is less than a first threshold value and the medium height change amount is equal to or more than a second threshold value, and not determining that a deflection of the medium has occurred and not stopping feeding the medium when the medium movement change amount is equal to or more than the first threshold value or when the medium height change amount is less the second threshold value.

16. The computer-readable, non-transitory medium according to claim 15, the process further comprising:
    detecting a third change amount of the medium placed on the medium tray in a direction parallel to the placing surface of the medium tray and perpendicular to the feeding direction; and determining that the deflection of the medium has occurred when the third change amount is equal to or more than a third threshold value.

17. The computer-readable, non-transitory medium according to claim 15, wherein the medium movement change amount and the medium height change amount are detected, based on an image generated by an imaging sensor.

18. The computer-readable, non-transitory medium according to claim 15, wherein the medium movement change amount and the medium height change amount are detected, based on information generated by a light sensor including a light emitter to emit light and a light receiver to detect a received light.

19. The computer-readable, non-transitory medium according to claim 15, wherein the medium placed on the medium tray is sequentially fed from a lower side.

20. The computer-readable, non-transitory medium according to claim 15, wherein
   the medium conveying apparatus further includes a sensor for detecting an actual movement amount of the medium placed on the medium tray, and wherein
   the medium movement change amount and the medium height change amount are detected, based on a detection result by the sensor.

* * * * *